US011310011B2

(12) United States Patent
Hao et al.

(10) Patent No.: US 11,310,011 B2
(45) Date of Patent: Apr. 19, 2022

(54) PHYSICAL RESOURCE GROUP SIZE FOR PRECODED CHANNEL STATE INFORMATION REFERENCE SIGNALS

(71) Applicant: Qualcomm Incorporated, San Diego, CA (US)

(72) Inventors: Chenxi Hao, Beijing (CN); Yu Zhang, Beijing (CN); Wanshi Chen, San Diego, CA (US); Chao Wei, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 16/623,009

(22) PCT Filed: Jun. 13, 2018

(86) PCT No.: PCT/CN2018/090989
§ 371 (c)(1),
(2) Date: Dec. 16, 2019

(87) PCT Pub. No.: WO2018/228411
PCT Pub. Date: Dec. 20, 2018

(65) Prior Publication Data
US 2021/0152303 A1 May 20, 2021

(30) Foreign Application Priority Data

Jun. 16, 2017 (WO) .............. PCT/CN2017/088719

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0456* (2013.01); *H04B 7/0626* (2013.01);
(Continued)

(58) Field of Classification Search
CPC ... H04L 5/0048; H04L 5/0053; H04L 5/0094; H04B 7/0456; H04B 7/0626; H04W 24/10
See application file for complete search history.

(56) References Cited

U.S. PATENT DOCUMENTS 9,148,204 B2 9/2015 Bhattad et al.
2013/0163507 A1* 6/2013 Hoshino .............. H04B 7/155
370/315
(Continued)

FOREIGN PATENT DOCUMENTS

CN 102316581 A 1/2012
CN 103096346 A 5/2013
(Continued)

OTHER PUBLICATIONS

InterDigital Inc. ( R1-1708346, "On REG bundling for PDCCH", Hangzhou, China, May 15-19, 2017) (Year: 2017).*
(Continued)

*Primary Examiner* — Maharishi V Khirodhar
(74) *Attorney, Agent, or Firm* — Holland & Hart LLP/Qualcomm

(57) ABSTRACT

Methods, systems, devices, and apparatus for wireless communication are described that relate to transmission of a set of precoded reference signals, and using a physical resource group (PRG) size for the resources carrying the set of reference signals for channel estimation at a user equipment (UE). For example, a base station may apply a precoding matrix to a set of reference signals, and the reference signals may be configured on a set of resources. In such cases, the resources including these reference signals having a same precoding may be included in a PRG, and a size of the PRG may refer to a number of precoded reference signals for which the precoding is the same. Based on the received reference signals and the PRG size the UE may perform channel estimation based on the PRG size and transmit channel state information (CSI) to the base station.

26 Claims, 19 Drawing Sheets

(51) Int. Cl.
*H04B 7/0456* (2017.01)
*H04B 7/06* (2006.01)
*H04W 24/10* (2009.01)

(52) U.S. Cl.
CPC .......... *H04L 5/0053* (2013.01); *H04L 5/0094* (2013.01); *H04W 24/10* (2013.01)

(56) References Cited

U.S. PATENT DOCUMENTS

| | | | |
|---|---|---|---|
| 2014/0348012 A1 | 11/2014 | Wu | |
| 2016/0087774 A1 | 3/2016 | Guo et al. | |
| 2016/0227520 A1* | 8/2016 | Davydov | H04L 5/00 |
| 2016/0337874 A1* | 11/2016 | Yang | H04B 7/0478 |
| 2018/0324760 A1* | 11/2018 | Yuk | H04L 5/0044 |

FOREIGN PATENT DOCUMENTS

| | | |
|---|---|---|
| CN | 103210605 A | 7/2013 |
| CN | 104125186 A | 10/2014 |
| WO | WO-2011163273 A1 | 12/2011 |
| WO | WO 2013141583 A1 | 9/2013 |
| WO | WO-2014208940 A1 | 12/2014 |

OTHER PUBLICATIONS

Huawei, HiSilicon ("PRB bundling size for DL data precoding", R1-1703342, Athens, Greece, Feb. 13-17, 2017). (Year: 2017).*

CATT (R1-1707473, Discussion on PRB bundling for DL). (Year: 2017).*

Sharp( R1-1703238, "CCE to REG mapping for NR", Feb. 13-17, 2017) (Year: 2017).*

"3rd Generation Partnership Project, Technical Specification Group Radio Access Network, Study on New Radio (NR) Access Technology Physical Layer Aspects (Release 14)", 3GPP TR 38.802, V1.2.0, Feb. 28, 2017(Feb. 28, 2017), Section 6.1.6.2, 83 Pages.

International Search Report and Written Opinion—PCT/CN2017/088719—ISA/EPO—dated Feb. 24, 2018.

International Search Report and Written Opinion—PCT/CN2018/090989—ISA/EPO—dated Sep. 3, 2018.

CATT: "Discussion on PRB Bundling for DL", 3GPP Draft; 3GPP TSG RAN WG1 Meeting #89, R1-1707473, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051272681, 3 Pages, Retrieved from the Internet: URL: http://www.3gpp.org/ftp/Meetings_3GPP_SYNC/RAN1/Docs/, [retrieved on May 14, 2017], Section 2.

Supplementary European Search Report—EP18817101—Search Authority—Munich—dated Jan. 19, 2021.

ZTE: "On PRB Bundling", 3GPP Draft; 3GPP TSG RAN WG1 Meeting #89, R1-1707116, On PRB Bundling, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051272342, 4 Pages, Retrieved from the Internet: URL: http://www.3gpp.org/ftp/Meetings_3GPP_SYNC/RAN1/Docs/, [retrieved on May 14, 2017], Section 2.

* cited by examiner

PHYSICAL RESOURCE GROUP SIZE FOR PRECODED CHANNEL STATE INFORMATION REFERENCE SIGNALS

CROSS REFERENCES

The application is a 371 national phase filing of International Patent Application No. PCT/CN2018/090989 by Chenxi et. al., entitled "PHYSICAL RESOURCE GROUP SIZE FOR PRECODED CHANNEL STATE INFORMATION REFERENCE SIGNALS", filed Jun. 13, 2018, which claims priority to International Patent Application No. PCT/CN2017/088719 by Chenxi et. al., entitled "PHYSICAL RESOURCE GROUP SIZE FOR PRECODED CHANNEL STATE INFORMATION REFERENCE SIGNALS", filed Jun. 16, 2017, each of which is assigned to the assignee hereof.

BACKGROUND

The following relates generally to wireless communication, and more specifically to a physical resource group (PRG) size for precoded reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a UE may communicate with a base station via multiple antennas using multiple input, multiple output (MIMO) techniques. For support of MIMO techniques, the base station may transmit reference signals (e.g., channel state information reference signals (CSI-RS)) to the UE. For each physical antenna, the UE may multiplex and precode multiple reference signals, and each reference signal may be associated with one or more different antenna ports. Precoding may refer to the application of a phase shift to one or more signals such that the signals reach an intended receiver in-phase (e.g., without destructively interfering). Precoding may be associated with a particular granularity, indicating a number of resource blocks (RB) for which the precoding does not change, and a UE may bundle RBs having the same precoding to perform channel estimation. However, in some cases, the UE may not be aware of the particular granularity of the resources having reference signals that share the same precoding.

SUMMARY

The described techniques relate to improved methods, systems, devices, or apparatuses that support a physical resource group (PRG) size for precoded reference signals. Generally, the described techniques provide for transmission of a set of precoded reference signals, such as a channel state information reference signal (CSI-RS), and using a PRG size for the resources carrying the set of reference signals for channel estimation at a user equipment (UE). For example, a base station may apply a precoding matrix to a set of reference signals, and the reference signals may be configured on a set of resources (e.g., resource blocks (RBs)). In such cases, the resources including these reference signals having a same precoding may be included in a PRG, and a size of the PRG may refer to a number of precoded reference signals for which the precoding is the same. In some cases, a first control signal from the base station may indicate a set of PRG sizes, while a second control signal may indicate a particular PRG size from the set of PRG sizes. Based on the received reference signals, the UE may then determine a particular PRG size, and perform channel estimation based on the PRG size. The UE may in turn transmit CSI parameters (e.g., including a channel quality indicator (CQI), and optionally a precoding matrix indicator (PMI) or a channel resource indication (CRI), to the base station based on the channel estimation.

A method of wireless communication is described. The method may include identifying one or more reference signal resources, determining a physical resource group (PRG) size associated with the one or more reference signal resources, wherein the PRG size is indicative of the one or more reference signal resources for which a precoding is the same for one or more precoded reference signals, and performing channel estimation using the one or more reference signal resources based at least in part on the determined PRG size.

An apparatus for wireless communication is described. The apparatus may include means for identifying one or more reference signal resources, means for determining a physical resource group (PRG) size associated with the one or more reference signal resources, wherein the PRG size is indicative of the one or more reference signal resources for which a precoding is the same for one or more precoded reference signals, and means for performing channel estimation using the one or more reference signal resources based at least in part on the determined PRG size.

Another apparatus for wireless communication is described. The apparatus may include a processor, memory in electronic communication with the processor, and instructions stored in the memory. The instructions may be operable to cause the processor to identify one or more reference signal resources, determine a physical resource group (PRG) size associated with the one or more reference signal resources, wherein the PRG size is indicative of the one or more reference signal resources for which a precoding is the same for one or more precoded reference signals, and perform channel estimation using the one or more reference signal resources based at least in part on the determined PRG size.

A non-transitory computer readable medium for wireless communication is described. The non-transitory computer-readable medium may include instructions operable to cause a processor to identify one or more reference signal resources, determine a physical resource group (PRG) size associated with the one or more reference signal resources, wherein the PRG size is indicative of the one or more reference signal resources for which a precoding is the same for one or more precoded reference signals, and perform channel estimation using the one or more reference signal resources based at least in part on the determined PRG size.

Some examples of the method, apparatus, and non-transitory computer-readable medium described above may further include processes, features, means, or instructions for transmitting channel state information (CSI) parameters based at least in part on the performed channel estimation. In some examples of the method, apparatus, and non-transitory computer-readable medium described above, each reference signal resource of the one or more reference signal resources is associated with one or more resource sets, and each of the one or more resource sets is associated with one or more resource settings.

Some examples of the method, apparatus, and non-transitory computer-readable medium described above may further include processes, features, means, or instructions for receiving a downlink control signal that comprises an indication of the PRG size, and determining the PRG size based at least in part on the indication. In some examples of the method, apparatus, and non-transitory computer-readable medium described above, the indication indicates the PRG size in a resource indication, a resource set configuration, or a resource setting configuration. In some examples of the method, apparatus, and non-transitory computer-readable medium described above, the PRG size indicated in the resource indication is for a reference signal resource of the one or more reference signal resources to which the resource indication corresponds, the PRG size indicated in the resource set configuration is the same for each reference signal resource of the one or more reference signal resources within a resource set to which the resource set configuration corresponds, the PRG size indicated in the resource setting configuration is the same for each reference signal resource of the one or more reference signal resources of any resource sets to which the resource setting configuration corresponds, or any combination thereof.

In some examples of the method, apparatus, and non-transitory computer-readable medium described above, determining the PRG size comprises: receiving at least a first downlink control signal, or a second downlink control signal, or both, wherein the first downlink control signal comprises a first indication of a set of PRG sizes, and wherein the second downlink control signal comprises a second indication of the PRG size from the set of PRG sizes. Some examples of the method, apparatus, and non-transitory computer-readable medium described above may further include processes, features, means, or instructions for determining the PRG size based at least in part on the first indication, or the second indication, or both. In some examples of the method, apparatus, and non-transitory computer-readable medium described above, each of the first indication and the second indication comprises a downlink control information (DCI) format, a cyclic redundancy check (CRC) scrambling type, or both In some examples of the method, apparatus, and non-transitory computer-readable medium described above, the first indication of the set of PRG sizes may be a same indication or a different indication used for a second set of PRG sizes associated with a demodulation reference signal (DMRS). In some examples of the method, apparatus, and non-transitory computer-readable medium described above, the set of PRG sizes may be the same as a second set of PRG sizes associated with a DMRS.

In some examples of the method, apparatus, and non-transitory computer-readable medium described above, the second indication of the PRG size may be a same indication or a different indication used for a second PRG size associated with a DMRS. In some examples of the method, apparatus, and non-transitory computer-readable medium described above, the PRG size may be the same as a second PRG size associated with a DMRS.

In some examples of the method, apparatus, and non-transitory computer-readable medium described above, each of the first downlink control signal and the second downlink control signal comprises downlink control information (DCI), a radio resource control (RRC) message, a medium access control (MAC) control element (CE), or a system information block (SIB).

In some examples of the method, apparatus, and non-transitory computer-readable medium described above, the set of PRG sizes may be fixed. Some examples of the method, apparatus, and non-transitory computer-readable medium described above may further include processes, features, means, or instructions for determining the PRG size based on the second indication. In some examples of the method, apparatus, and non-transitory computer-readable medium described above, the PRG size may be a fixed PRG size. In some examples of the method, apparatus, and non-transitory computer-readable medium described above, determining the PRG size comprises: identifying a first resource and a second resource associated with the one or more reference signal resources, and determining a first PRG size associated with the first resource and determining a second PRG size associated with the second resource.

Some examples of the method, apparatus, and non-transitory computer-readable medium described above may further include processes, features, means, or instructions for identifying a preferred resource from the first resource and the second resource based at least in part on the first PRG size and the second PRG size. Some examples of the method, apparatus, and non-transitory computer-readable medium described above may further include processes, features, means, or instructions for transmitting a CRI signaling the preferred resource.

In some examples of the method, apparatus, and non-transitory computer-readable medium described above, a value of the PRG size may be based at least in part on a PRG size of a DMRS and data, a multiple of a RBG size, a portion of the RBG size, a system bandwidth, a UE capability, a reference signal pattern, or any combination thereof.

In some examples of the method, apparatus, and non-transitory computer-readable medium described above, each reference signal comprises a channel state information reference signal (CSI-RS). In some examples of the method, apparatus, and non-transitory computer-readable medium described above, the one or more reference signal resources comprise a RB. In some examples of the method, apparatus, and non-transitory computer-readable medium described above, the CSI parameters comprise at least a CQI, a RI, a PMI, a CRI, or any combination thereof.

A method of wireless communication is described. The method may include applying a precoding matrix to one or more reference signal resources, configuring a physical resource group (PRG) size associated with the one or more reference signal resources, wherein the PRG size is indicative of the one or more reference signal resources for which a precoding is the same for one or more precoded reference signals, and transmitting the one or more precoded reference signals.

An apparatus for wireless communication is described. The apparatus may include means for applying a precoding matrix to one or more reference signal resources, means for configuring a physical resource group (PRG) size associated with the one or more reference signal resources, wherein the PRG size is indicative of the one or more reference signal resources for which a precoding is the same for one or more precoded reference signals, and means for transmitting the one or more precoded reference signals.

Another apparatus for wireless communication is described. The apparatus may include a processor, memory in electronic communication with the processor, and instructions stored in the memory. The instructions may be operable to cause the processor to apply a precoding matrix to one or more reference signal resources, configure a physical resource group (PRG) size associated with the one or more reference signal resources, wherein the PRG size is indicative of the one or more reference signal resources for which a precoding is the same for one or more precoded reference signals, and transmit the one or more precoded reference signals.

A non-transitory computer readable medium for wireless communication is described. The non-transitory computer-readable medium may include instructions operable to cause a processor to apply a precoding matrix to one or more reference signal resources, configure a physical resource group (PRG) size associated with the one or more reference signal resources, wherein the PRG size is indicative of the one or more reference signal resources for which a precoding is the same for one or more precoded reference signals, and transmitting the one or more precoded reference signals.

In some examples of the method, apparatus, and non-transitory computer-readable medium described above, configuring the PRG size comprises: transmitting at least a first downlink control signal, or a second downlink control signal, or both, wherein the first downlink control signal comprises a first indication of a set of PRG sizes, and wherein the second downlink control signal comprises a second indication of the PRG size from the set of PRG sizes. In some examples of the method, apparatus, and non-transitory computer-readable medium described above, each of the first indication and the second indication comprises a downlink control information (DCI) format, a cyclic redundancy check (CRC) scrambling type, or both. In some examples of the method, apparatus, and non-transitory computer-readable medium described above, each reference signal resource of the one or more reference signal resources is associated with one or more resource sets, and each of the one or more resource sets is associated with one or more resource settings.

In some examples of the method, apparatus, and non-transitory computer-readable medium described above, configuring the PRG size comprises: transmitting a downlink control signal that comprises an indication of the PRG size. In some examples of the method, apparatus, and non-transitory computer-readable medium described above, the indication indicates the PRG size in a CSI-RS resource indication, a resource set configuration, or a resource setting configuration.

In some examples of the method, apparatus, and non-transitory computer-readable medium described above, the first indication of the set of PRG sizes may be a same indication or a different indication used for a second set of PRG sizes associated with a DMRS. In some examples of the method, apparatus, and non-transitory computer-readable medium described above, the set of PRG sizes may be the same as a second set of PRG sizes associated with a DMRS.

In some examples of the method, apparatus, and non-transitory computer-readable medium described above, the second indication of the PRG size may be a same indication or a different indication used for a second PRG size associated with a DMRS. In some examples of the method, apparatus, and non-transitory computer-readable medium described above, the PRG size may be the same as a second PRG size associated with a DMRS.

In some examples of the method, apparatus, and non-transitory computer-readable medium described above, the first downlink control signal and the second downlink control signal comprises DCI, a RRC message, a MAC CE, or a SIB. Some examples of the method, apparatus, and non-transitory computer-readable medium described above may further include processes, features, means, or instructions for configuring the PRG size based on the second indication. In some examples of the method, apparatus, and non-transitory computer-readable medium described above, the PRG size may be a fixed PRG size.

In some examples of the method, apparatus, and non-transitory computer-readable medium described above, configuring the PRG size comprises: configuring a first PRG size associated with a first resource and configuring a second PRG size associated with a second resource, wherein the transmitted precoded reference signals comprise the first resource and the second resource. Some examples of the method, apparatus, and non-transitory computer-readable medium described above may further include processes, features, means, or instructions for receiving, as part of CSI parameters, a CRI signaling a preferred resource based at least in part on the first resource and the second resource.

In some examples of the method, apparatus, and non-transitory computer-readable medium described above, the PRG size may be based at least in part on a PRG size of a DMRS and data, a multiple of a RBG size, a portion of the RBG size, a system bandwidth, a UE capability, a reference signal pattern, or any combination thereof. Some examples of the method, apparatus, and non-transitory computer-readable medium described above may further include processes, features, means, or instructions for receiving CSI parameters from a UE based on the configured PRG size, wherein the CSI parameters comprise at least a CQI, a RI, a PMI, a CRI, or any combination thereof. In some examples of the method, apparatus, and non-transitory computer-readable medium described above, each reference signal resource of the one or more reference signal resources comprises a channel state information reference signal (CSI-RS) resource.

DETAILED DESCRIPTION

Figure 1:
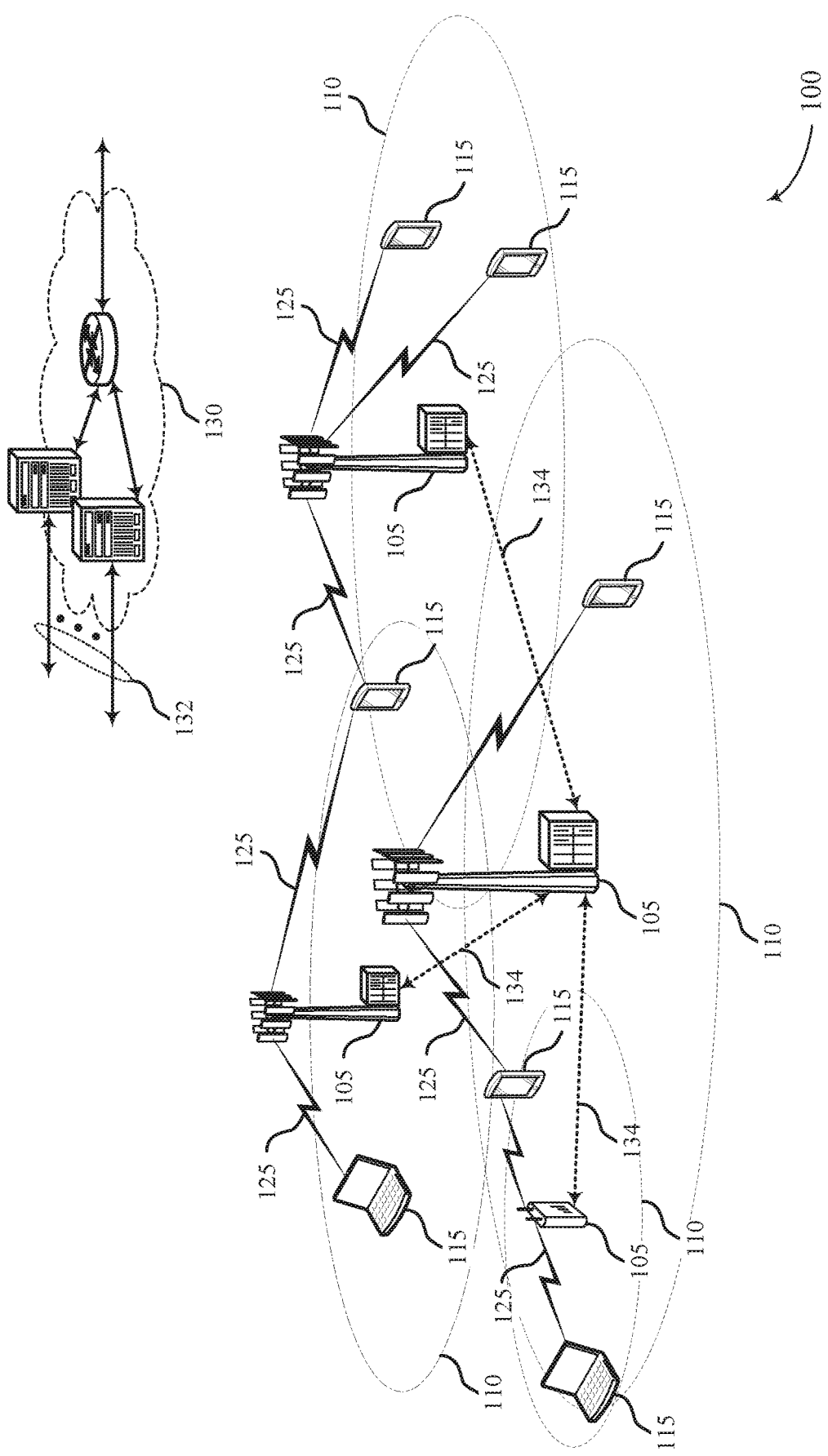
FIG. 1 illustrates an example of a system for wireless communication that supports physical resource group (PRG) size for precoded reference signals in accordance with aspects of the present disclosure.

The described techniques relate to improved methods, systems, devices, or apparatuses that support a physical resource group (PRG) size for precoded reference signals. Generally, the described techniques provide for transmission of a set of precoded reference signals, such as a channel state information reference signal (CSI-RS), and using a PRG size for the resources carrying the set of reference signals for channel estimation at a user equipment (UE). In a wireless communications system, a base station may apply a precoding matrix to a set of reference signals, and the reference signals may be configured on a set of resources, such as resource blocks. In such cases, the resources including these reference signals having a same precoding may be included in a PRG, and a size of the PRG may refer to a number of precoded reference signals for which the precoding is the same. A first control signal from the base station may indicate a set of PRG sizes, while a second control signal may indicate a particular PRG size from the set of PRG sizes. Based on the received reference signals and the PRG size, the UE may perform channel estimation in accordance with the PRG size and transmit channel state information to the base station.

A wireless communications system may support communication between a base station and a user equipment (UE). Specifically, the wireless communications system may support downlink transmissions from the base station to the UE and uplink transmissions from the UE to a base station. Downlink transmissions may include data, control signals, and reference signals (e.g., channel state information reference signals (CSI-RS), etc.). Different reference signal waveforms may be multiplexed over a set of frequency resources (i.e., using frequency division multiplexing (FDM) and/or time division multiplexing (TDM)) for a given uplink transmission on an antenna. For example, a base station may identify respective single-carrier reference signal streams to be transmitted to a UE, and these streams may be precoded for the transmission. In some cases, the same precoder may be applied across the entire transmission bandwidth in a downlink transmission. In other examples, different precoders may be used for the transmission of reference signals within partial bandwidths (e.g., parts of a wideband system bandwidth). In cases where multiple reference signals are transmitted using different precoding, a UE may benefit from knowledge associated with groups of reference signals that are precoded in the same way. Furthermore, the UE may also benefit from knowledge of the precoding granularity or the number of resources carrying references signals that are precoded in the same way.

As described herein, reference signals in one or more resource blocks (RBs) having a same precoder may be defined by a physical resource group (PRG) size. A PRG size may vary according to one or more PRG size configurations and the PRG size may refer to a precoding granularity for CSI-RS. In some cases, a first downlink control signal may configure a set of PRG sizes, and a second downlink control signal may configure a specific PRG size according to the set of PRG sizes. A UE may determine the PRG size using the first downlink control signal, the second downlink control signal, or both. In such cases, the second downlink control signal be used to dynamically or semi-persistently configure a specific PRG size of the PRG size set from the first downlink control transmission. In any event, the UE may utilize the PRG size information for efficient channel estimation procedures using sets of RBs with reference signals with the same precoding. The UE may then transmit CSI to a base station.

Aspects of the disclosure are initially described in the context of a wireless communications system. These and other features are further illustrated by and described with reference to various block diagrams, transmission schemes, and process flows. Aspects of the disclosure are further illustrated by and described with reference to apparatus diagrams, system diagrams, and flowcharts that relate to physical resource group size for precoded channel state information reference signals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may enable or support PRG size signaling for precoded CSI-RS as described herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may support the transmission of a set of precoded reference signals, such as CSI-RS, and using a PRG size associated with the resources carrying the set of reference signals for channel estimation at a UE 115. For example, a base station 105 may apply a precoding matrix to a set of reference signals, and the reference signals may be configured on a set of RBs. The RBs including these reference signals may having a same precoding and may be included in a PRG. Accordingly, a size of the PRG may refer to a number of precoded reference signals for which the precoding is the same in the RBs or subcarriers. In some cases, a first control signal from the base station 105 may indicate a set of PRG sizes, while a second control signal may indicate a particular PRG size from the set of PRG sizes. Based on the received reference signals, the UE 115 may then determine a particular PRG size, and perform channel estimation based on the PRG size. The UE may in turn transmit CSI to the base station 105 based on the channel estimation.

Figure 2:
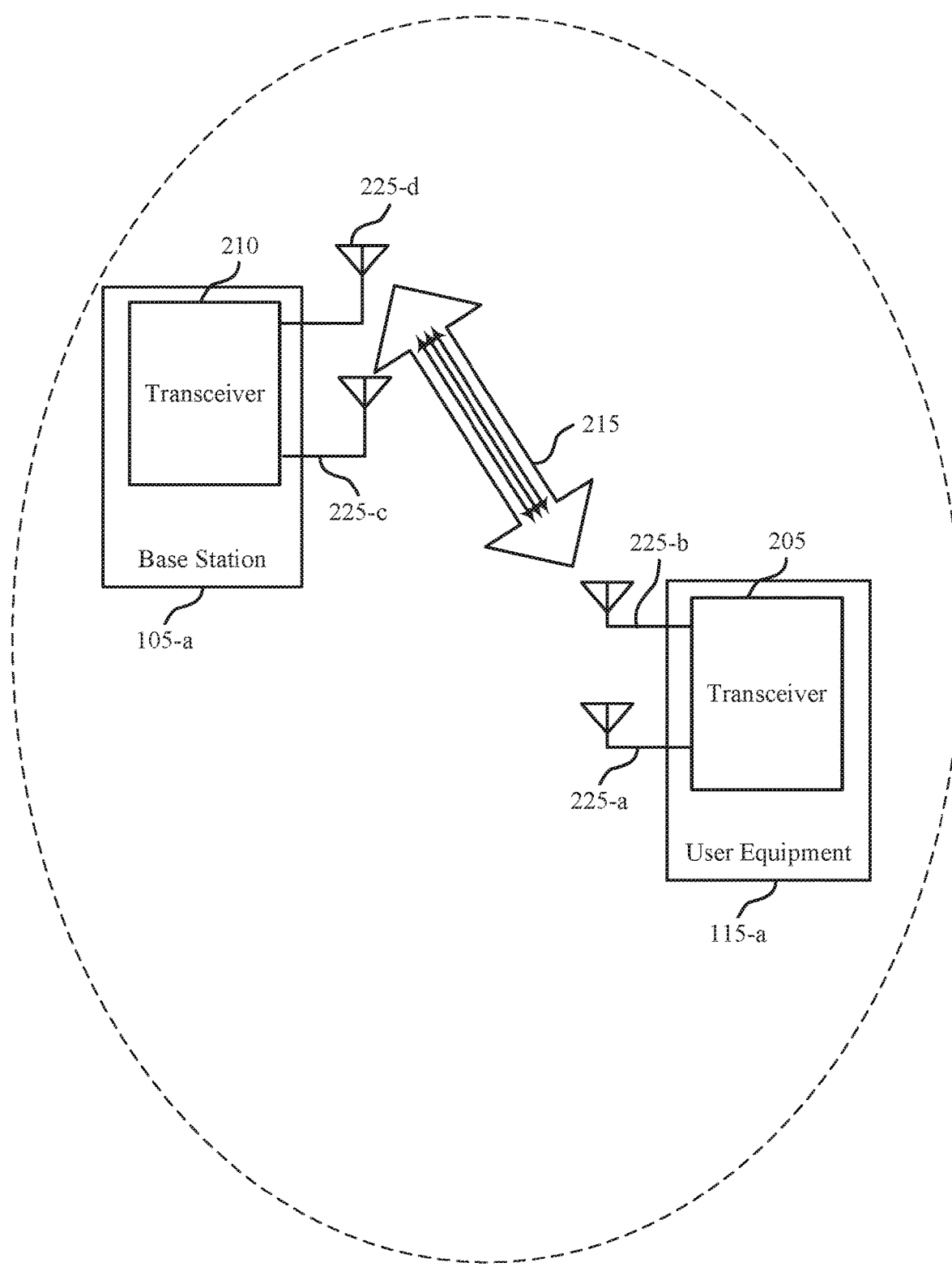
FIG. 2 illustrates an example of a wireless communications system that supports a PRG size for precoded reference signals in accordance with aspects of the present disclosure.

FIG. 2 illustrates an example of a wireless communications system 200 that supports a PRG size for precoded channel state information reference signals in accordance with various aspects of the present disclosure. Wireless communications system 200 includes base station 105-*a*, which may be an example of a base station 105 described with reference to FIG. 1. Wireless communication system also includes UE 115-*a*, which may be an example of a UE 115 described with reference to FIG. 1. UE 115-*a* may be configured with a transceiver 205 (e.g., including a transmitter and a receiver) used to transmit or receive signals to base station 105-*a*, and base station 105-*a* may be configured with a transceiver 210 used to transmit and receive signals from UE 115-*a*. For example, base station 105-*a* may transmit one or more reference signals (such as CSI-RSs) to UE 115-*a*, and upon receiving the reference signals, UE 115-*a* may transmit CSI feedback to base station 105-*a*.

UE 115-*a* may communicate with base station 105-*a* via multiple antennas 225 using MIMO techniques. In such cases, a UE 115-*a* may transmit multiple parallel data streams to base station 105-*a* (e.g., to increase the data rate within wireless communications system 200). In some cases, the quality of a channel used to transmit each parallel data stream may depend on, e.g., the multipath environment, precoding, interference, etc. Precoding may refer to the application of weighting (e.g., phase shifting, amplitude scaling, etc.) to a set of signals such that the superposition of these signals at a receiving device improves the received signal quality (e.g., improves the signal-to-interference and noise ratio (SINR) of a transmission). In order to support efficient scheduling of resources, a base station 105-*a* may allocate resources based on an estimate of the quality of different channels used to transmit reference signals.

Base station 105-*a* may transmit reference signals (e.g., CSI-RS) over a bandwidth to facilitate channel estimation and reporting of CQI. CSI-RS transmissions may enable an estimation of the quality of a channel used to transmit data via antennas 225. In some cases (e.g., in the case of a LTE wireless communications system), CSI-RS may be transmitted over a wide bandwidth (i.e. wideband CSI-RS). In other cases (e.g., in the case of a NR wireless communications system), CSI-RS may be transmitted as wideband CSI-RS or on a partial radio frequency band (i.e., a partial-band CSI-RS). The timing of the CSI-RS transmissions may be controlled by the base station 105-*a*. Additionally, base station 105-*a* may control the transmission bandwidth using cell-specific parameters and mobile-specific parameters (e.g., the CSI-RS bandwidth configuration). In wireless communications system 200, a base station 105-*a* and a UE 115-*a* may be configured (e.g., via higher layer signaling) to transmit and receive, respectively, the CSI-RS on a suitable number of antenna ports of a serving cell (e.g., ports 0, 1, 2, and 4). That is, reference signals may be spatially multiplexed on channels used to transmit data via antennas 225 to facilitate an accurate estimate of the quality of channels used for MIMO data transmissions.

In some cases, to provide for scheduling flexibility and CSI reporting accuracy for precoded CSI-RS, an adopted precoder may vary across different sub-bands within a partial radio frequency bandwidth or a wideband. In PRG-level precoder cycling, two precoders may be used in a cyclic manner across different RBs. Additionally or alternatively, in multi-user (MU) pre-scheduling, base station 105-*a* may precode the CSI-RS based on MU-scheduling. For example, a first UE 115 and a second UE 115 may be paired in a first sub-band, while the first UE 115 and a third UE 115 may be paired in a second sub-band. Accordingly, for the first UE 115, the precoder may be different for the first sub-band as compared to the second sub-band.

In some cases, it may be beneficial for a UE 115 to be aware of a precoding granularity. That is, it may be desirable for the UE 115 to be aware of or be able to determine a quantity of RBs for which the precoder may change, so that corresponding PRBs may be accordingly bundled to perform channel estimation. In some cases, it may further be desirable to provide such a precoding granularity. As described in further detail below, UE 115-*a* may use a PRG size for CSI-RS resources to efficiently perform channel estimation for reporting CST parameters (e.g., including CQI, RI, PMI, a CSI resource indicator (CRI), and the like) to base station 105-*b*.

Figure 3:
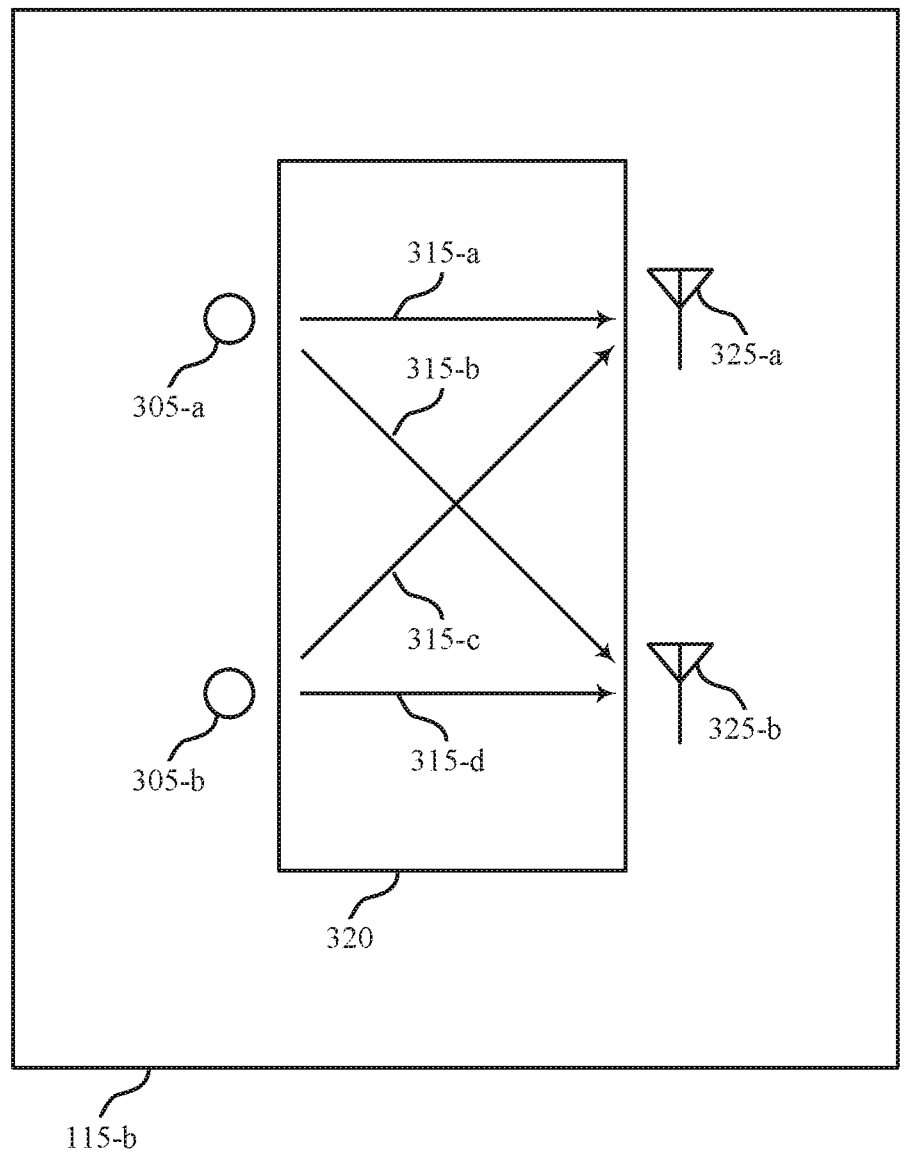
FIG. 3 illustrates a block diagram of a wireless device that supports a PRG size for precoded reference signals in accordance with aspects of the present disclosure.

FIG. 3 illustrates a block diagram 300 of a UE 115-*b* that supports a PRG size for precoded reference signals in accordance with aspects of the present disclosure. UE 115-*b* may be an example of a UE 115 (or a base station 105) described with reference to FIGS. 1 and 2. As illustrated, UE 115-*b* contains two logical antenna ports 305 which are connected to physical antennas 325-*a* and 325-*b*. Physical antennas 325-*a* and 325-*b* may be examples of the transmitting antennas 225-*a* and 225-*b* described with reference to FIG. 2. In the present example, a precoding matrix is applied to signals at logical antenna ports 305 using precoder 320 (e.g., by matrix multiplication) and these signals are mapped to the physical antennas 325.

The present example illustrates a single precoding matrix 320, however multiple precoding matrices may be used (e.g., a different precoding matrix may be applied to different frequency bands, tones, physical resource blocks (PRBs), PRGs, etc.). Although displayed as having two logical antenna ports 305 and two physical antennas 325, any suitable number of ports or antennas may be used within the scope of the present disclosure. In some cases, the number of logical antenna ports 305 may be less than or equal to the number of physical antennas 325. Accordingly, the number of logical antenna ports 305 and physical antennas 325 need not be equal.

In the present example, each logical antenna port 305 may have one or more respective reference signals associated with it. In some cases, the precoding matrix 320 may be an n-by-m matrix, connecting 'm' logical antenna ports to 'n' physical antennas (e.g., by matrix multiplication). Accordingly, precoding matrix 320 may apply appropriate phase shifts and/or amplitude modulation to the respective reference signals of antenna ports 305. As an example, a reference signal of antenna port 305-*a* may be modified (e.g., phase shifted or otherwise altered) according to precoding phasor 315-*a* before being mapped to physical antenna 325-*a*. In some examples, precoding phasor 315-*a* may be a complex number such that the matrix multiplication achieves frequency and amplitude modulation. Similarly, a reference signal at antenna port 305-*b* may be modified according to precoding phasor 315-*c* before being combined with the precoded reference signal from antenna port 305-*a* for transmission via physical antenna 325-*a*. Reference signals 305-*a* and 305-*b* may be precoded using similar techniques before being mapped to physical antenna 325-*b* (e.g., by precoding phasor components 315-*b* and 315-*d*, respectively). In aspects of the present disclosure, physical antennas 325-*a* and/or 325-*b* may be operable to transmit multiple precoded reference signals over respective sub-bands (e.g., such that each sub-band is associated with a respective precoder 320).

Figure 4A:
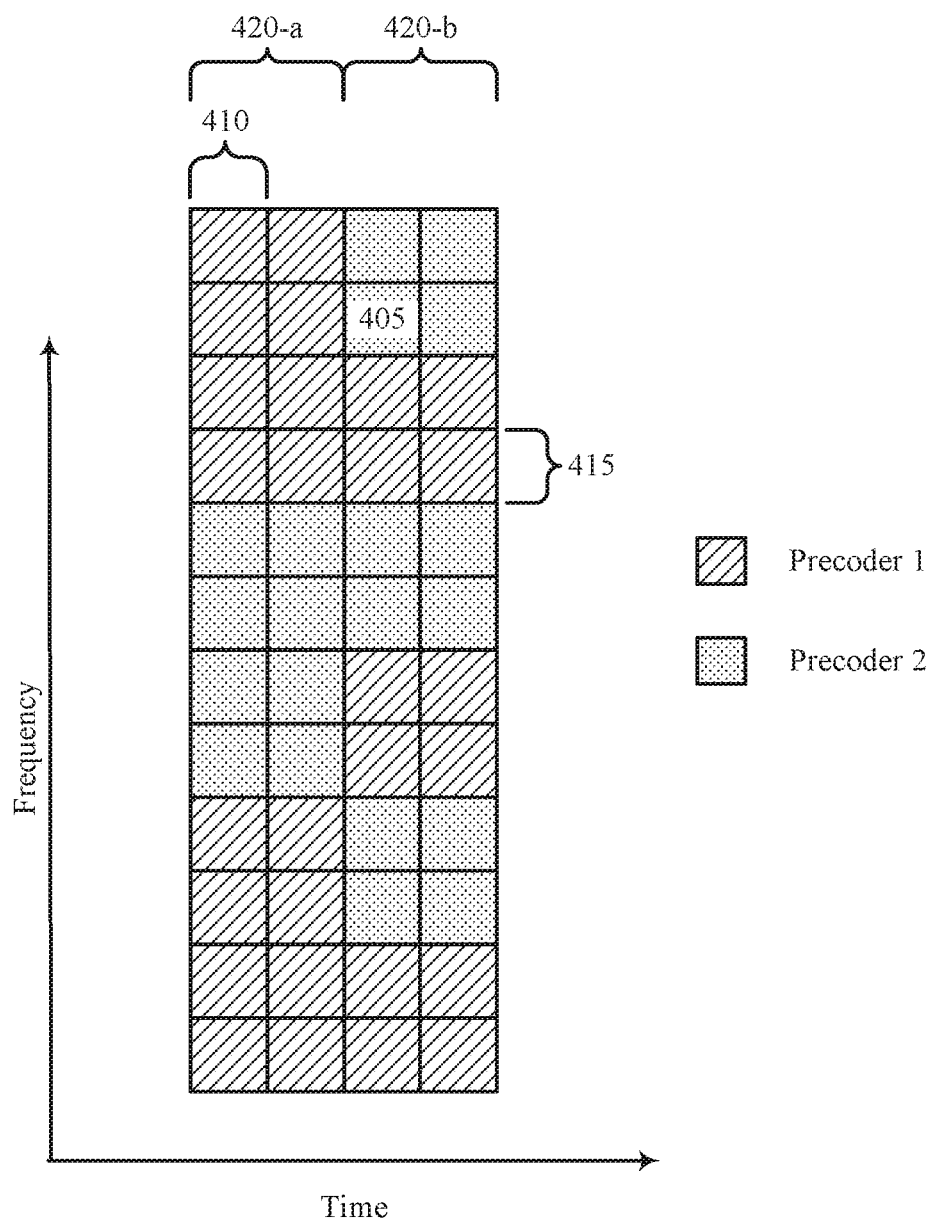
FIGS. 4A and 4B illustrate examples of block transmissions that support a PRG size for precoded reference signals in accordance with various aspects of the present disclosure.
Figure 4B:
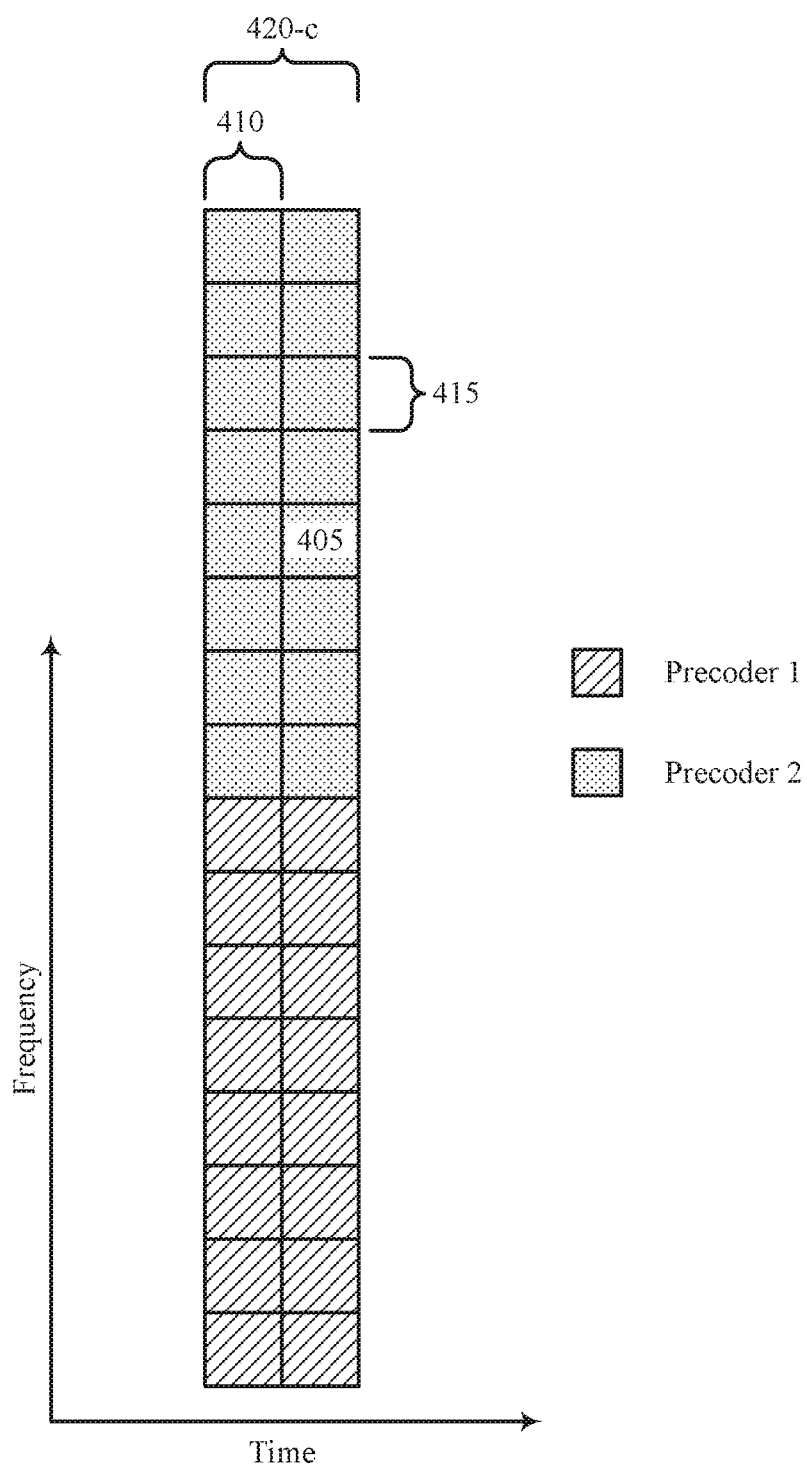

FIGS. 4A and 4B illustrate examples of block transmissions 401 and 402 that supports a PRG size for precoded reference signals in accordance with various aspects of the present disclosure. In some examples, block transmissions 401 and 402 may implement aspects of wireless communications system 100. Block transmissions 401 and 402 may be an example of RBs transmitted by a base station 105 to one or more UEs 115. The UEs 115 receiving block transmissions 401 and 402 may indicate a respective radio frequency (RF) band associated with one or more received blocks.

For example, block transmissions 401 and 402 may include one or more resource blocks 405 transmitted by a base station 105 during symbol periods 410. A PRG may have a size, where a size indicates a number of RBs 405 in the PRG. In the case of frequency division multiplexed RBs 405, the RBs 405 may each be transmitted in a respective RF band 415 during a same symbol period 410. In some cases, RF bands 415 may be different RF bands of a CC or may be representative of one or more CCs in a system bandwidth. In one example, multiple transmission blocks may be transmitted in a single CC in different bandwidth portions within a same CC.

A precoder may be applied to reference signals within one or more RBs 405, where RBs 405 including reference signals having a same precoder may be defined by a PRG size. A PRG size may vary according to one or more PRG size configurations, and a PRG size may refer to a precoding granularity for CSI-RS. For example, a first PRG configuration may have a granularity of two RBs 405, whereas a second PRG configuration may have a granularity of four RBs 405. A precoder may be fixed for each of the subcarrier in the PRG.

As an illustrative example, block transmission 401 may include first reference signal resources 420-*a* and second reference signal resources 420-*b*, each corresponding to, for example, different sets of RBs 405 used for transmitting CSI-RS differentiated in the time domain. In the example of block transmission 401, first reference signal resources 420-*a* may include two symbol periods 410 of RBs 405, and first reference signal resources 420-*a* may have a PRG size of four (e.g., four RBs 405 per PRG). Likewise, second reference signal resources 420-*b* may include RBs 405 over multiple symbol periods 410, but may have a PRG size of two (e.g., two RBs 405 per PRG). Accordingly, first reference signal resources 420-*a* may include three sets of RBs 405, where each set of RBs 405 comprises a PRG, and a different precoder is used for adjacent PRGs, whereas second reference signal resources 420-*a* may include six sets of RBs 405, where each set of RBs 405 comprises a PRG and a different precoder is used for different RBs.

Additionally or alternatively, a larger PRG size (e.g., a PRG size equal to eight) may be used for transmitting reference signals. As illustrated in block transmission 402, third reference signal resources 420-*c* may include sets of RBs 405 used for transmitting CSI-RS. Third reference signal resources may include RBs 405 over multiple symbol periods 410, and include an RBG size of eight corresponding to eight RBs 405 in each PRG, and each PRG using a different precoder. Such configurations may be used, for example, in multiple user pre-scheduling by a network entity.

Additionally or alternatively, one or more reference signal resources 420 may be included in a resource set. In some cases, a resource setting may specify a configuration of two or more resource sets, with each resource set within the resource setting including one or more reference signal resources 420. In some cases, a reference signal resource may be associated with one or more resource sets, and a resource set may be associated with one or more resource settings. In some examples, an indication of PRG size may be for a particular resource setting. In turn, the resource setting may be associated with resource sets, and each of the reference signal resources 420 that comprise the associated resource sets. In some cases, a particular indication may be associated with a particular resource set and each of the reference signal resources 420 that comprise the resource set. In some cases, different indications may apply to different resource sets within the same resource setting. For example, a resource setting may include two resource sets, with each resource set associated with a different indication of PRG size. In some examples, an indication may be specified for a particular reference signal resource 420, and more than one indication may apply to different reference signal resources 420 in the same resource set.

In some examples, if an indication of PRG size is in a resource indication (e.g., a CSI-RS resource indication), the UE 115 may associate the PRG size to a resource (e.g., a CSI-RS resource) indicated in or otherwise corresponding to the resource indication. If an indication of PRG size is in a resource set configuration (e.g., a CSI-RS resource set configuration), the UE 115 may associate the PRG size to one or more resources (e.g., CSI-RS resources) indicated in or otherwise corresponding to the resource set configuration. If an indication of PRG size is in a resource setting configuration (e.g., a CSI-RS resource setting configuration), the UE 115 may associate the PRG size to resources (e.g., CSI-RS resources) of any resource sets indicated in or otherwise corresponding to the resource setting configuration.

A value representing a PRG size may be determined based on factors including, for example: a PRG size of a DMRS and data, a RBG (i.e., a scheduling unit) size, a bandwidth including one or more RF bands 415 (e.g., being either wideband or partial band), a capability of a UE 115, and a CSI-RS pattern. If, for example, the PRG size is determined based on an RBG size, the PRG size may be given by (RBG size)/k, or RBG size*m, where k and m are defined as integer numbers of resources.

In PRG level precoder cycling, two or more precoders may be used in a cyclic (i.e., alternating) manner between the different RBGs having different PRG size configurations. For example, an even number precoder may alternate with an odd numbered precoder. For a precoded CSI-RS where the number of integers k is greater than 1, the PRG size may be different for different CSI-RS resources. For example, for a CSI-RS resource 1, the PRG size may be equal to 2, while for a CSI-RS resource 2, the PRG size may be equal to 4. Then, a UE 115 may determine whether to use 2 or 4 PRBs for its PRG size (i.e., the first PRG configuration or the second PRG configuration), for example, based on which of the configurations may be preferable for physical downlink shared channel (PDSCH) performance. In this case, the UE 115 may accordingly report a CSI-RS resource indication (CSI-RI) to a base station 105 to indicate to the base station 105 of its preferred PRG size for the CSI-RS resource, so that the base station 105 may accordingly use the preferred PRG size. In some cases, the signaling of a preferred CSI-RS resource may indicate a single resource, and CSI feedback to the base station 105 may include CQI, and optionally RI and/or PMI. Additionally or alternatively, if multiple CSI-RS resources are indicated through the signaling of preferred CSI-RS resources, CSI parameters sent to the base station 105 may include at least a CRI, CQI, and optionally RI and/or PMI.

In another example, to perform multi-user transmissions, a network or base station 105 may perform pre-scheduling, where in a first sub-band, the base station 105 may pair a first UE 115 and a second UE 115, while in a second sub-band 2, the base station 105 may pair the first UE 115 and a third UE 115. In such cases, a precoded CSI-RS for the first UE 115 may be transmitted using different precoders in the first sub-band and the second sub-band (e.g., as illustrated by block transmission 402). Accordingly, to allow the first UE 115 to perform channel estimation and derive CSI parameters, a PRG size may be equal to the sub-band size (e.g., 4 or 8 RBs).

In some cases, a downlink control signal may configure a specific PRG size. For example, the UE 115 may identify one or more reference signal resources, and determine an indication of a PRG size that corresponds to the one or more reference signal resources. In some cases, a PRG size of a reference signal resource may be specified in a per resource indication, for example, a CSI-RS resource indication that includes an indication of the PRG size for a particular CSI-RS resource. The UE 115 may determine the PRG size of the CSI-RS resource as specified in the per resource set indication, and the PRG size may differ on a reference signal resource by reference signal resource basis.

In some cases, the configuration of the one or more reference signal resources may be specified on a per resource set indication. For example, the UE 115 may receive a resource set configuration, where each of the reference signal resources (e.g., CSI-RS resources) in the resource set share a common PRG size. The UE 115 may determine the PRG size of the reference signal resources within the resource set as specified in the per resource set indication, and the PRG size may differ on a resource set by resource set basis. In some cases, the identified one or more reference signal resources may be associated with the same or different resource sets, and the UE 115 may determine per resource set indication to determine a PRG size for each of the one or more reference signal resources.

In some cases, the configuration of the one or more reference signal resources may occur on a per resource setting configuration. For example, the UE 115 may receive a resource setting configuration, where the reference signal resources of the resource sets within the resource setting share the same PRG size. The UE 115 may determine the PRG size of the corresponding one or more reference signal resources within the resource sets of a particular resource setting based on a PRG size indicated in the resource setting configuration, and the PRG size may differ on a resource setting by resource setting basis. In some cases, the identified one or more reference signal resources may be associated with the same or different resource settings, and the UE 115 may determine per resource setting indication to determine a PRG size for each of the one or more reference signal resources.

In some cases, a first downlink control signal may configure a set of PRG sizes, and then a second downlink control signal may configure a specific PRG size according to the set of PRG sizes. First, a first downlink control signal may be used to configure a PRG size set for CSI-RS. The first downlink control signal may transmitted through, for example, downlink control information (DCI), RRC signaling, MAC control element (CE) signaling, or in a system information block (SIB), which may have a relatively larger period. In some cases, the PRG size set for CSI-RS may also be used for signaling of the PRG size set for DMRS. That is, the PRG size set for CSI-RS may share the same PRG size set for DMRS, for example, a 1-bit indication. In some cases, a fixed PRG size set mapping may be adopted for a particular system bandwidth, so that both the UE 115 and the base station 105 may accordingly use a predetermined size set, so as to not use additional signaling.

Then, a second downlink control signal may be used to dynamically or semi-persistently configure a specific PRG size of the PRG size set from the first downlink control transmission. The second downlink control signal may be transmitted through, for example, RRC signaling, MAC CE signaling, or in a SIB, if, for example, the precoded CSI-RS is used for measurement, or the precoder is based on a long-term or wideband transmission beam. Additionally or alternatively, the second downlink control signal may be signaled through DCI, if a dynamic configuration is supported by the UE 115 and the base station 105 (e.g., if the precoded CSI-RS is used for MU pre-scheduling).

In some cases, the signaling for the value representing the PRG size may be the same as for signaling of the PRG size indication for DMRS. Additionally or alternatively, the signaling for the value representing the PRG size may be different than for signaling of the PRG size indication for DMRS, for example, a CSI-RS trigger. In some cases, the value for the PRG size may be equal to that of the PRG size for DMRS, for example, a 1-bit indication. In some cases, a fixed PRG size may be adopted for a particular system bandwidth, so that both the UE 115 and the base station 105 may accordingly use a predetermined size set, so as to not use additional signaling.

In some cases, the signaling of the PRG size set and the signaling for the value representing the PRG size comprises a DCI format, a cyclic redundancy check (CRC) scrambling type, or both. For instance, if the DCI is format 1_0, then a first PRG size of the PRG size set is utilized by the UE 115. If the DCI is format 1_1, then a second PRG size of the PRG size set is utilized by the UE 115. Additionally or alternatively, if a first type of DCI scrambling is used (e.g., scrambling DCI with the cell radio network temporary identifier (C-RNTI) or a configured scheduling RNTI (CS-RNTI), then a first PRG size of the PRG size set indicated in the signaling is utilized by the UE 115. If a second type of DCI scrambling is used (e.g., scrambling DCI with the system information RNTI (SI-RNTI), random access RNTI (RA-RNTI), paging RNTI (P-RNTI), or temporary C-RNTI), then the second PRG size of the PRG size set indicated in the signaling is utilized by the UE.

Figure 5:
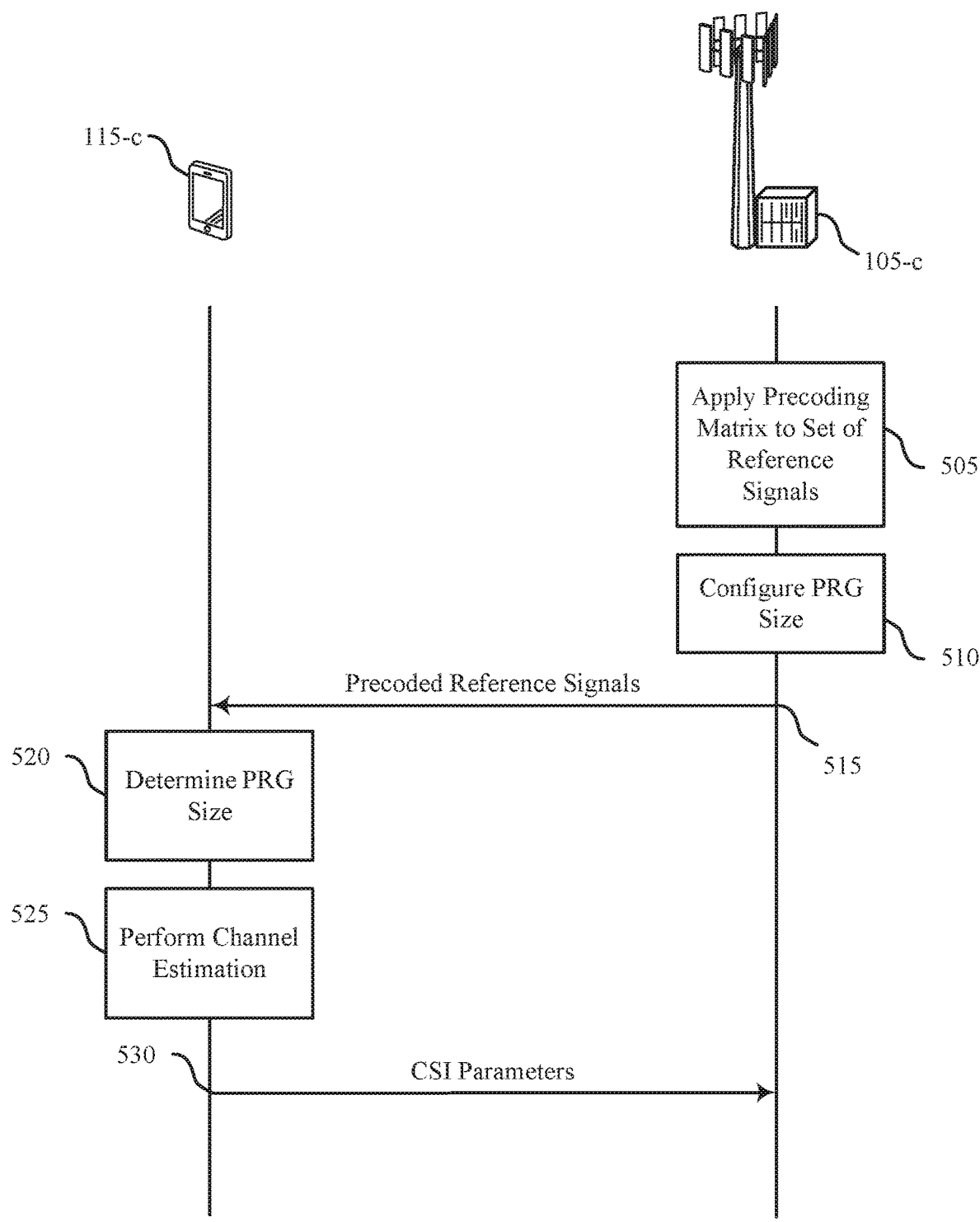
FIG. 5 illustrates an example of a process flow that supports a PRG size for precoded reference signals in accordance with various aspects of the present disclosure.

FIG. 5 illustrates an example of a process flow 500 that supports a PRG size for precoded reference signals in accordance with various aspects of the present disclosure, in accordance with various aspects of the present disclosure. In some examples, process flow 500 may implement aspects of wireless communications system 100. For example, process flow includes a UE 115-b and base station 105-b, which may be examples of the corresponding devices described with reference to FIGS. 1-4.

At 505, base station 105-c may apply a precoding matrix to a set of reference signals. This may include, for example, applying appropriate phase shifts and/or amplitude modulation to each of the reference signals of each of respective antenna port of base station 105-c, as described with reference to FIG. 3.

At 510, base station 105-c may configure a PRG size associated with one or more reference signal resources. Base station 105-c may configure a first PRG size associated with first reference signal resources and configure a second PRG size associated with second reference signal resources. In some cases, the PRG size may be based on a PRG size of DMRS and data, a multiple of a RBG size, a portion of the RBG size, a system bandwidth, a UE capability, a reference signal pattern, or a combination thereof. In some cases, the PRG size may be indicated in a set of one or more reference signal resources for which a precoding is the same for one or more of the precoded reference signals of the set of precoded reference signals. In some cases, the PRG size may be fixed.

At 515, base station 105-c may transmit the set of precoded reference signals (e.g., CSI-RS) to UE 115-c. The reference signals may each include one or more RBs. Each of the precoded reference signals of the set of precoded reference signals may be transmitted and received on one or more corresponding reference signal resources. Base station 105-c may further transmit to UE 115-c an indication of a specific PRG size in a downlink control signal. This may occur on a per resource indication, for example, a CSI-RS resource indication may include an indication of the PRG size. In some cases, the configuration may occur on a per-set indication. For example, the UE 115 may receive a resource set configuration, where the resources configured in the set share a common PRG size. The UE 115 may then determine the PRG size of the corresponding resource based on the PRG size indicated in the per-set indication. In some cases, the configuration may occur on a per-setting indication. For example, the UE 115 may receive a resource setting configuration, where the resources of the resource sets configured in the setting share the same PRG size. The UE 115 may then determine the PRG size of the corresponding resource based on PRG size indicated in the per-setting indication.

In some examples, base station 105-c may further transmit to UE 115-c a first indication in a first downlink control signal of a set of PRG sizes, and a second indication in a second downlink control signal of a particular PRG size from the set of PRG sizes. The first downlink control signal may indicate a set of PRG sizes. In some cases, the first indication may be the same as an indication used to indicate a second set of PRG sizes for a DMRS, where the PRG size is the same for the DMRS as for the CSI-RS. Alternatively, the first indication may be different from indication used to indicate a second set of PRG sizes for the DMRS. In some cases, the first downlink control signal may be signaled via a RRC message, a MAC CE, or a SIB. The second downlink control signal indicates a particular PRG size from the set of PRG sizes. In some cases, the second indication may be the same as an indication used to indicate a second set of PRG sizes for a DMRS, where the PRG size is the same for the DMRS as for the CSI-RS. Alternatively, the second indication may be different from indication used to indicate a second set of PRG sizes for the DMRS. In some cases, the first downlink control signal may be signaled via DCI, a RRC message, a MAC CE, or a SIB.

At 520, UE 115-c may determine a PRG size based on the one or more reference signals. The PRG size may indicate a set of the one or more reference signal resources for which a precoding is the same for one or more precoded reference signals of the set of precoded reference signals. UE 115-c may determine a first PRG size based on first reference signal resources, and determine a second PRG size associate based on second reference signal resources. In some cases, a value of the PRG size may be based on a PRG size of DMRS and data, a multiple of a RBG size, a portion of the RBG size, a system bandwidth, a UE capability, and a reference signal pattern. In some cases, the PRG size may be fixed.

At 525, UE 115-c may perform channel estimation using the set of the one or more reference signal resources based on the determined PRG size at 520. Based on the determined PRG sizes, UE 115-c may identify a preferred reference signal resource from the first reference signal resource and the second reference signal resource.

At 530, UE 115-c may transmit to base station 105-c, and base station 105-c may receive from UE 115-c, CSI parameters measured during the performed channel estimation at 525. In some cases, the CSI parameters may include a CQI, a rank indicator (RI), and a precoding matrix indicator (PMI). UE 115-c may further transmit, as part of the CSI parameters, a CRI signaling the preferred reference signal resource, as identified at 525. In some examples, the UE 115-c may be configured with one active resource set. The active resource set may have multiple reference signal resources with a resource-specific PRG size, and the UE 115-c may report a preferred reference signal resource from the active resource set via CRI signaling.

Figure 6:
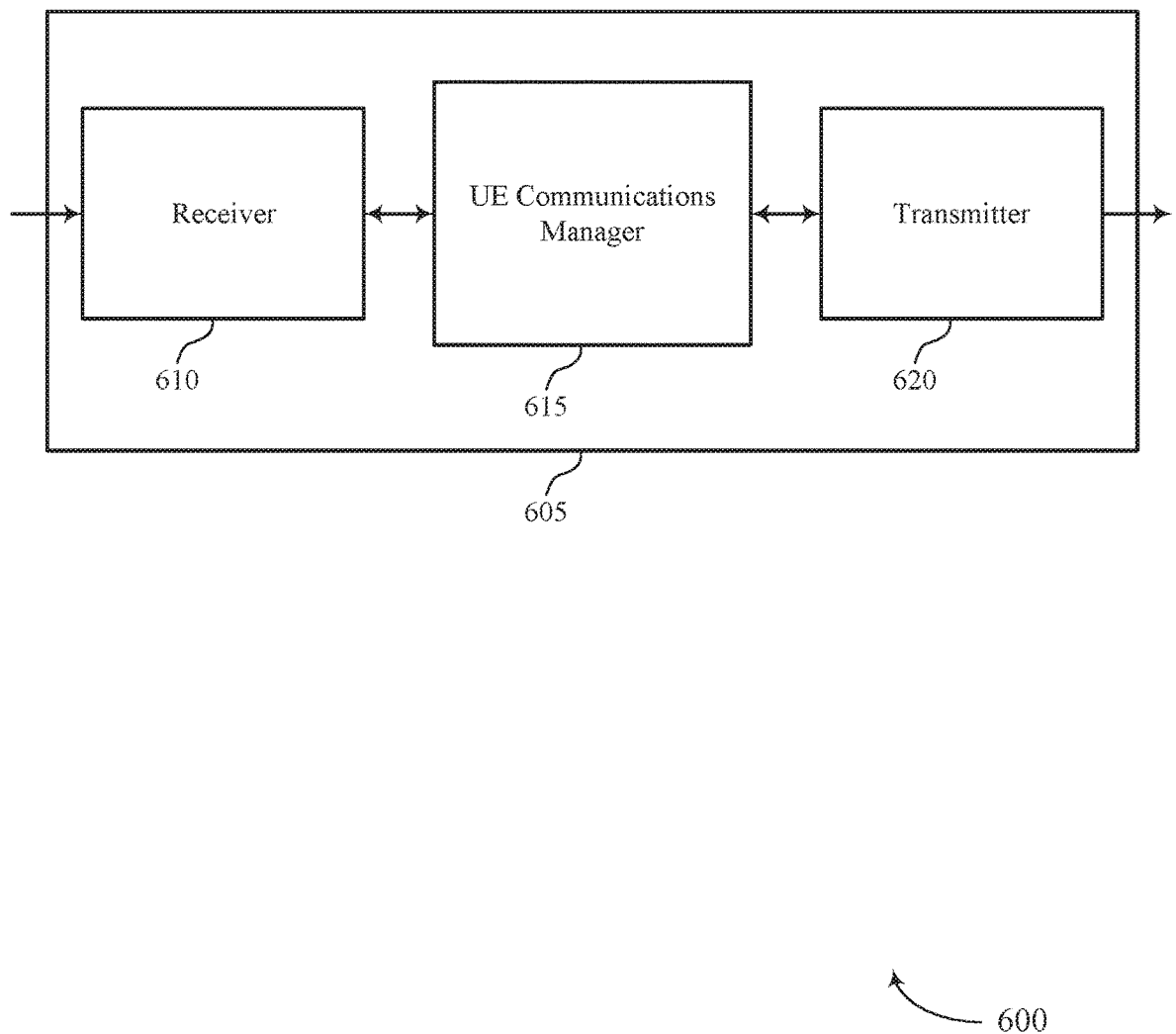
FIGS. 6 through 8 show block diagrams of a device that supports a PRG size for precoded reference signals in accordance with aspects of the present disclosure.

FIG. 6 shows a block diagram 600 of a wireless device 605 that supports a PRG size for precoded reference signals in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to physical resource group size for precoded channel state information reference signals, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify one or more reference signal resources, determine a physical resource group (PRG) size associated with the one or more reference signal resources, wherein the PRG size is indicative of the one or more reference signal resources for which a precoding is the same for one or more precoded reference signals, and perform channel estimation using the one or more reference signal resources based at least in part on the determined PRG size.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may transmit channel state information (CSI) parameters based at least in part on the performed channel estimation. The transmitter 620 may utilize a single antenna or a set of antennas.

Figure 7:
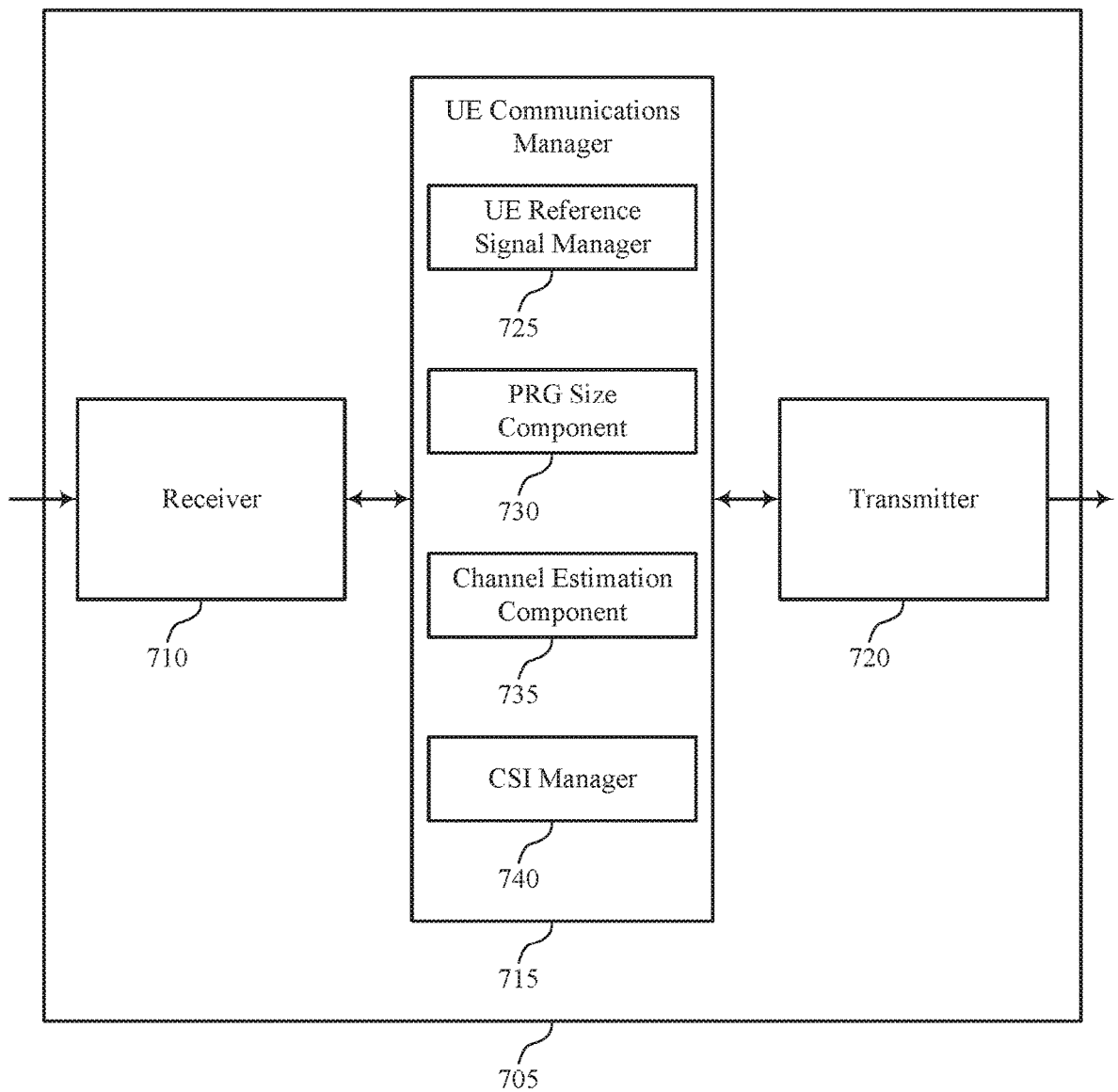

FIG. 7 shows a block diagram 700 of a wireless device 705 that supports a PRG size for precoded reference signals in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to physical resource group size for precoded channel state information reference signals, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include UE reference signal manager 725, PRG size component 730, channel estimation component 735, and CSI manager 740.

UE reference signal manager 725 may identify one or more reference signal resources. In some cases, each reference signal resource includes a CSI-RS resource. In some cases, the one or more reference signal resources include a resource block (RB).

PRG size component 730 may determine the PRG size based at least in part on the indication. In some cases, the indication indicates the PRG size in a CSI-RS resource indication, a resource set configuration, or a resource setting configuration. PRG size component 730 may determine a PRG size associated with the one or more reference signal resources, where the PRG size may be indicative of the one or more reference signal resources for which a precoding is the same for one or more precoded reference signals. In some cases, a value of the PRG size is based on a PRG size of a DMRS and data, a multiple of a RBG size, a portion of the RBG size, a system bandwidth, a UE capability, a reference signal pattern, or any combination thereof. In some cases, a value of the PRG size is based on a PRG size of a DMRS and data, a multiple of a RBG size, a portion of the RBG size, a system bandwidth, a UE capability, a reference signal pattern, or any combination thereof. In some cases, PRG size component 730 may determine the PRG size based on a first indication, or a second indication, or both, and determine the PRG size based on the second indication. In some cases, the first indication of the set of PRG sizes is a same indication or a different indication used for a second set of PRG sizes associated with a DMRS. In some cases, the set of PRG sizes are the same as a second set of PRG sizes associated with the DMRS. In some cases, the second indication of the PRG size is a same indication or a different indication used for a second PRG size associated with the DMRS.

In some cases, PRG size component 730 may identify a first resource and a second resource associated with the set of the one or more reference signal resources, and determine a first PRG size associated with the first resource and determining a second PRG size associated with the second resource. In some cases, a first downlink control signal (e.g., for indicating a PRG size set) includes DCI, an RRC message, a MAC CE, or a SIB. In some cases, a second downlink control signal (e.g., for indicating a PRG size) includes DCI, an RRC message, a MAC CE, or a SIB. In some cases, the PRG size may be fixed or PRG sizes in the set of PRG sizes may be fixed. Additionally or alternatively, the PRG size is the same as a second PRG size associated with the DMRS.

Channel estimation component 735 may perform channel estimation using the one or more reference signal resources based on the determined PRG size. CSI manager 740 may transmit CSI parameters based on the performed channel estimation and transmit, as part of the CSI parameters, a channel resource indicator (CRI) signaling the preferred reference signal resource. In some cases, the CSI parameters include at least a CQI, an RI, a PMI, a CRI, or any combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
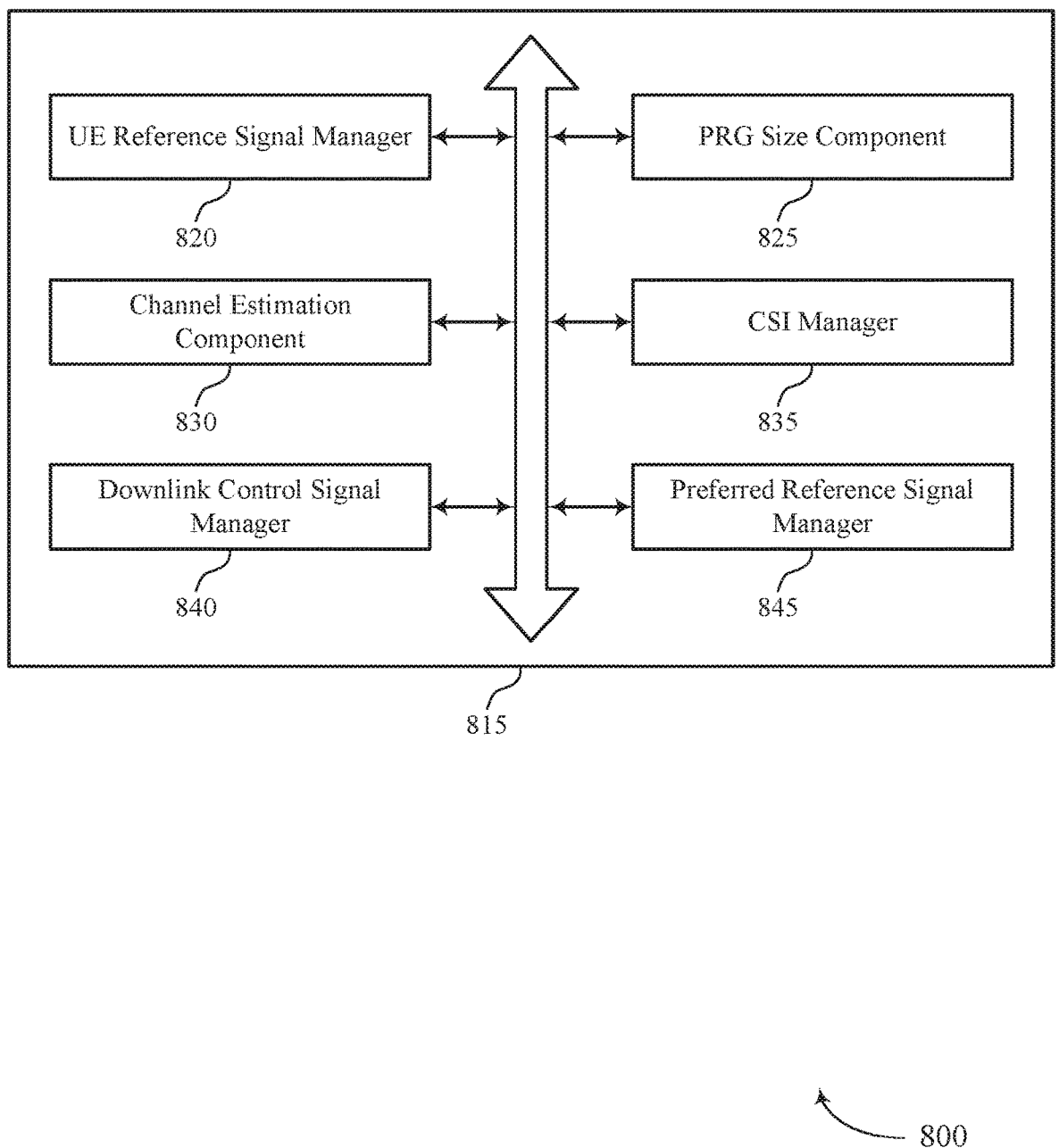

FIG. 8 shows a block diagram 800 of a UE communications manager 815 that supports a PRG size for precoded reference signals in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include UE reference signal manager 820, PRG size component 825, channel estimation component 830, CSI manager 835, downlink control signal manager 840, and preferred reference signal manager 845. Each of these modules may communicate, directly or indirectly, with one another (e.g., via one or more buses).

UE reference signal manager 820 may receive one or more precoded reference signals, each precoded reference signal being received on one or more reference signal resources. In some cases, each reference signal includes a CSI-RS. In some cases, the one or more reference signal resources include a RB.

PRG size component 825 may determine a PRG size associated with the one or more reference signal resources, where the PRG size may be indicative of the one or more reference signal resources for which a precoding is the same for one or more precoded reference signals. In some cases, a value of the PRG size is based on a PRG size of a DMRS and data, a multiple of a RBG size, a portion of the RBG size, a system bandwidth, a UE capability, a reference signal pattern, or any combination thereof. In some cases, a value of the PRG size is based on a PRG size of a DMRS and data, a multiple of a RBG size, a portion of the RBG size, a system bandwidth, a UE capability, a reference signal pattern, or any combination thereof. In some cases, PRG size component 825 may determine the PRG size based on a first indication, or a second indication, or both, and determine the PRG size based on the second indication. In some cases, the first indication of the set of PRG sizes is a same indication or a different indication used for a second set of PRG sizes associated with a DMRS. In some cases, the set of PRG sizes are the same as a second set of PRG sizes associated with the DMRS. In some cases, the second indication of the PRG size is a same indication or a different indication used for a second PRG size associated with the DMRS.

In some cases, determining the PRG size may include determining a first PRG size associated with a first reference signal resources and determining a second PRG size associated with a second reference signal resource. In some cases, a first downlink control signal (e.g., for indicating a PRG size set) includes an RRC message, a MAC CE, or a SIB. In some cases, a second downlink control signal (e.g., for indicating a PRG size) includes DCI, an RRC message, a MAC CE, or a SIB. In some cases, the PRG size may be fixed or PRG sizes in the set of PRG sizes may be fixed. Additionally or alternatively, the PRG size is the same as a second PRG size associated with the DMRS.

Channel estimation component 830 may perform channel estimation using the one or more reference signal resources based on the determined PRG size. CSI manager 835 may transmit CSI parameters based on the performed channel estimation and transmit a channel resource indicator (CRI) signaling the preferred resource. In some cases, the CSI parameters include at least a CQI, an RI, a PMI, a CRI, or any combination thereof.

Downlink control signal manager 840 may receive at least a first downlink control signal, or a second downlink control signal, or both, where the first downlink control signal includes a first indication of a set of PRG sizes, and where the second downlink control signal includes a second indication of the PRG size from the set of PRG sizes. Downlink control signal manager 840 may receive a downlink control signal that comprises an indication of the PRG size. Preferred reference signal manager 845 may identify a preferred resource from the first resource and the second resource based at least in part on the first PRG size and the second PRG size.

Figure 9:
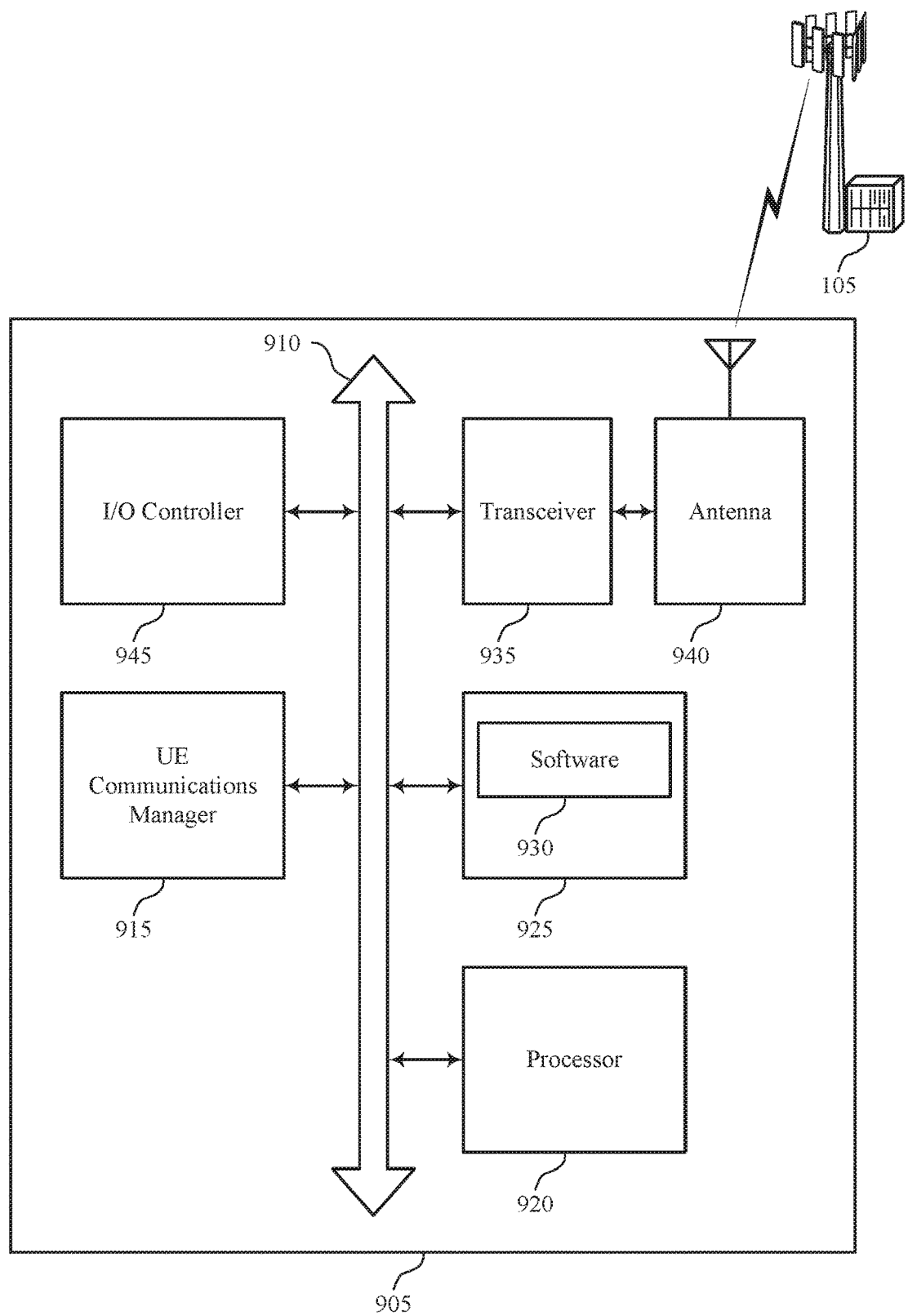
FIG. 9 illustrates a block diagram of a system including a UE that supports a PRG size for precoded reference signals in accordance with aspects of the present disclosure.

FIG. 9 shows a diagram of a system 900 including a device 905 that supports a PRG size for precoded reference signals in accordance with aspects of the present disclosure. Device 905 may be an example of or include the components of wireless device 605, wireless device 705, or a UE 115 as described above, e.g., with reference to FIGS. 6 and 7.

Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting physical resource group size for precoded channel state information reference signals).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support physical resource group size for precoded channel state information reference signals. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
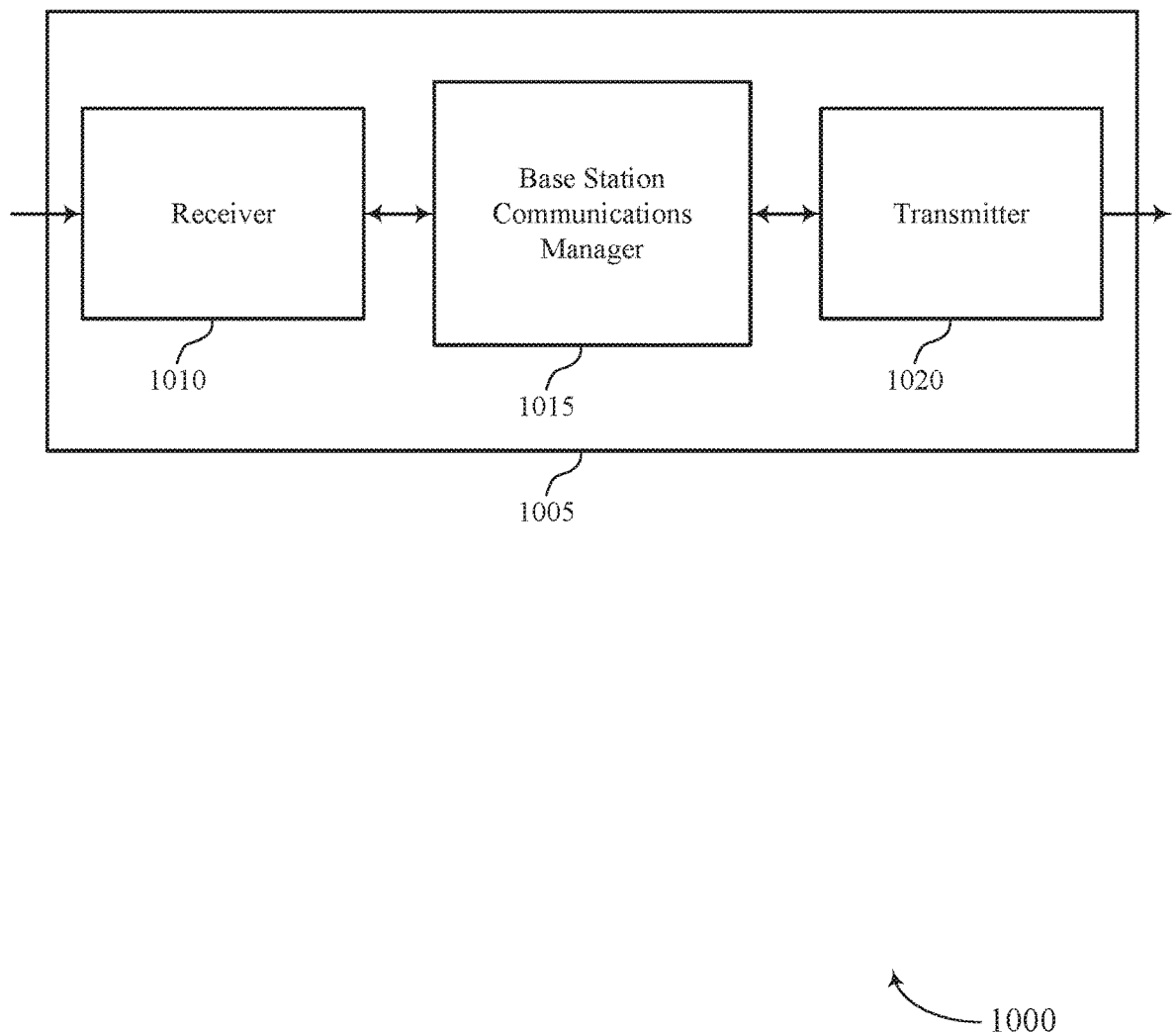
FIGS. 10 through 12 show block diagrams of a device that supports a PRG size for precoded reference signals in accordance with aspects of the present disclosure.

FIG. 10 shows a block diagram 1000 of a wireless device 1005 that supports a PRG size for precoded reference signals in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to physical resource group size for precoded channel state information reference signals, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may apply a precoding matrix to one or more reference signal resources, configure a PRG size associated with the one or more reference signal resources, wherein the PRG size is indicative of the one or more reference signal resources for which a precoding is the same for one or more precoded reference signals, and transmit the one or more precoded reference signals.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may transmit a downlink control signal that comprises an indication of the PRG size. The transmitter 1020 may utilize a single antenna or a set of antennas.

Figure 11:
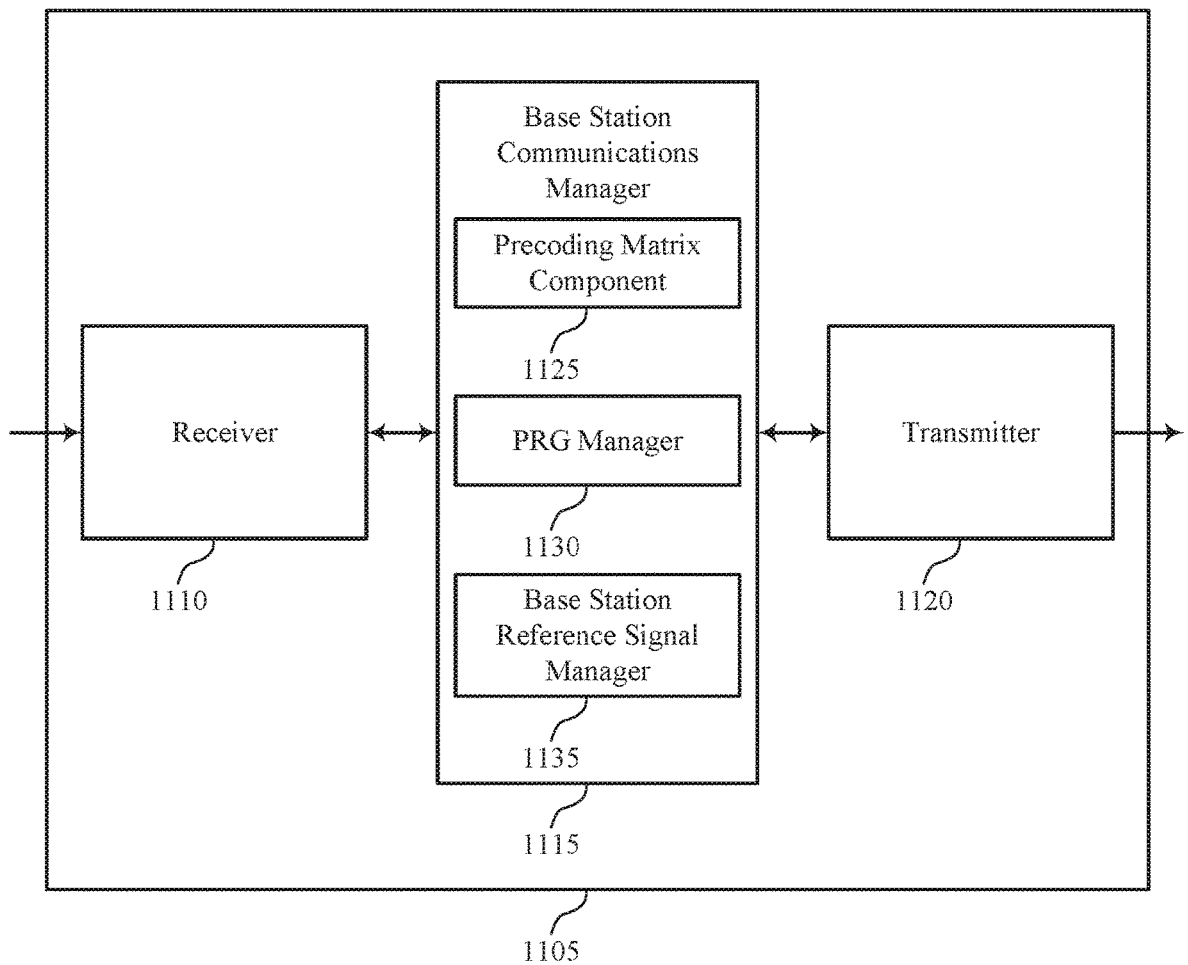

FIG. 11 shows a block diagram 1100 of a wireless device 1105 that supports a PRG size for precoded reference signals in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to physical resource group size for precoded channel state information reference signals, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include precoding matrix component 1125, PRG manager 1130, and base station reference signal manager 1135.

Precoding matrix component 1125 may apply a precoding matrix to one or more reference signals. PRG manager 1130 may configure a PRG size associated with one or more reference signal resources, where the PRG size is indicative of the one or more reference signal resources for which a precoding is the same for one or more precoded reference signals. In some cases, the PRG size is based on a PRG size of a DMRS and data, a multiple of a RBG size, a portion of the RBG size, a system bandwidth, a UE capability, a reference signal pattern, or any combination thereof. In some cases, configuring the PRG size may include transmitting at least a first downlink control signal, or a second downlink control signal, or both, where the first downlink control signal includes a first indication of a set of PRG sizes, and where the second downlink control signal includes a second indication of the PRG size from the set of PRG sizes.

In some examples, PRG manager 1130 may configure the PRG size based on a second indication. In some cases, the first indication of the set of PRG sizes is a same indication or a different indication used for a second set of PRG sizes associated with a DMRS. In some cases, the set of PRG sizes are the same as a second set of PRG sizes associated with a DMRS. In some cases, the second indication of the PRG size is a same indication or a different indication used for a second PRG size associated with a DMRS. In some cases, the PRG size is the same as a second PRG size associated with a DMRS. In some cases, the second downlink control signal includes DCI, a RRC message, a MAC CE, or a SIB. In some cases, the PRG size and/or PRG set size is a fixed PRG size. Additionally or alternatively, configuring the PRG size includes configuring a first PRG size associated with a first resource and configuring a second PRG size associated with a second resource, wherein the transmitted precoded reference signals comprise the first resource and the second resource. In some cases, the first downlink control signal includes a RRC message, a MAC CE, or a SIB.

Base station reference signal manager 1135 may transmit the one or more precoded reference signals, each precoded reference signal being transmitted on one or more reference signal resources.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
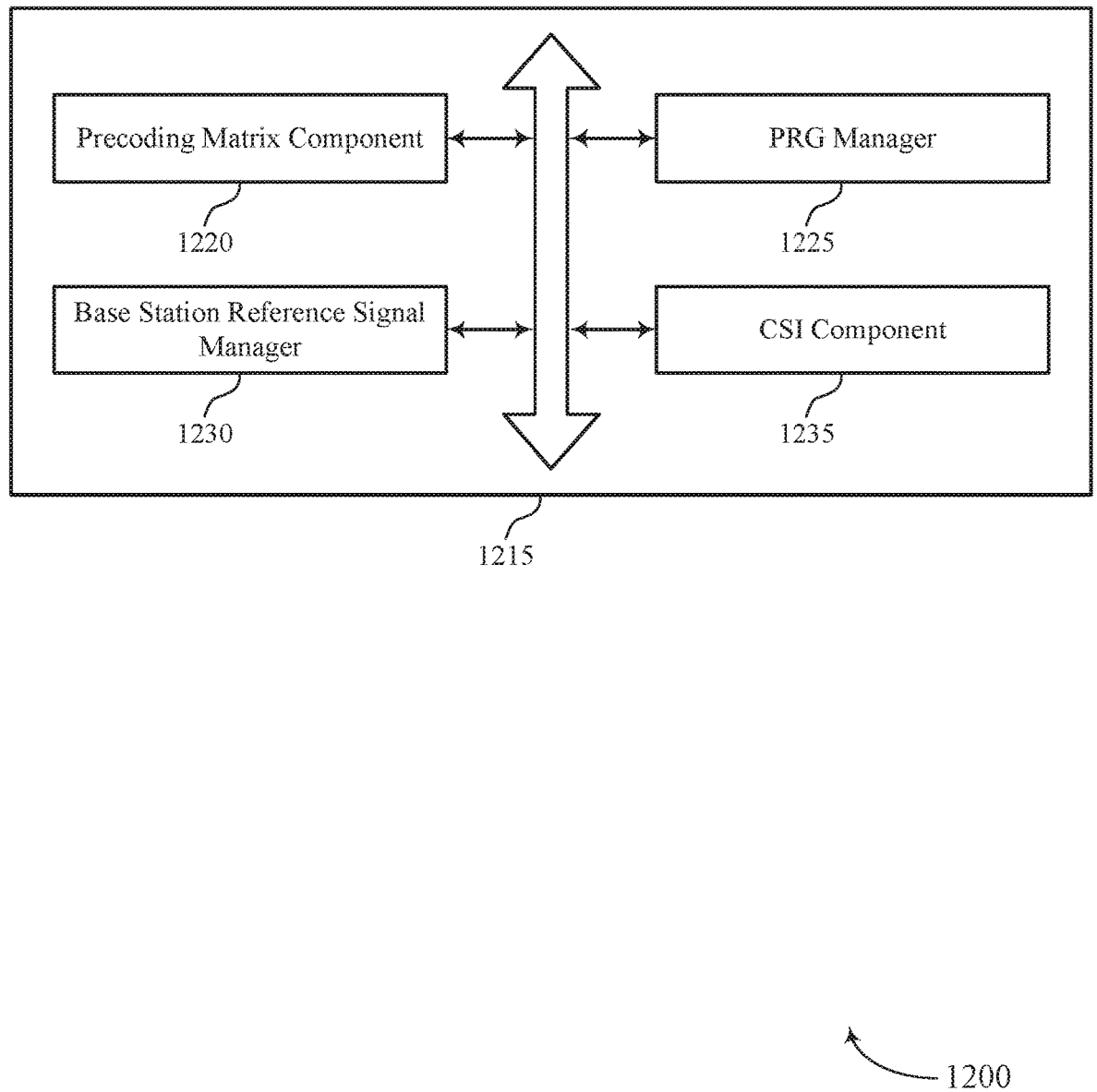

FIG. 12 shows a block diagram 1200 of a base station communications manager 1215 that supports a PRG size for precoded reference signals in accordance with aspects of the present disclosure. The base station communications manager 1215 may be an example of aspects of a base station communications manager 1315 described with reference to FIGS. 10, 11, and 13. The base station communications manager 1215 may include precoding matrix component 1220, PRG manager 1225, base station reference signal manager 1230, and CSI component 1235. Each of these modules may communicate, directly or indirectly, with one another (e.g., via one or more buses).

Precoding matrix component 1220 may apply a precoding matrix to one or more reference signals. PRG manager 1225 may configure a PRG size associated with one or more reference signal resources, where the PRG size is indicative of the one or more reference signal resources for which a precoding is the same for one or more precoded reference signals. In some cases, the PRG size is based on a PRG size of a DMRS and data, a multiple of a RBG size, a portion of the RBG size, a system bandwidth, a UE capability, a reference signal pattern, or any combination thereof. In some cases, configuring the PRG size may include transmitting at least a first downlink control signal, or a second downlink control signal, or both, where the first downlink control signal includes a first indication of a set of PRG sizes, and where the second downlink control signal includes a second indication of the PRG size from the set of PRG sizes.

In some examples, PRG manager 1225 may configure the PRG size based on a second indication. In some cases, the first indication of the set of PRG sizes is a same indication or a different indication used for a second set of PRG sizes associated with a DMRS. In some cases, the set of PRG sizes are the same as a second set of PRG sizes associated with a DMRS. In some cases, the second indication of the PRG size is a same indication or a different indication used for a second PRG size associated with a DMRS. In some cases, the PRG size is the same as a second PRG size associated with a DMRS. In some cases, the second downlink control signal includes DCI, a RRC message, a MAC CE, or a SIB. In some cases, the PRG size and/or PRG set size is a fixed PRG size. Additionally or alternatively, configuring the PRG size includes configuring a first PRG size associated with a first reference signal resources and configuring a second PRG size associated with a second reference signal resource. In some cases, the first downlink control signal includes a RRC message, a MAC CE, or a SIB.

Base station reference signal manager 1230 may transmit the one or more precoded reference signals, each precoded reference signal being transmitted on one or more reference signal resources.

CSI component 1235 may receive, as part of CSI parameters, a CRI signaling a preferred resource based at least in part on the first resource and the second resource and receive CSI parameters from a UE 115 based on the configured PRG size, where the CSI parameters include at least a CQI, an RI, a PMI, a CRI, or any combination thereof.

Figure 13:
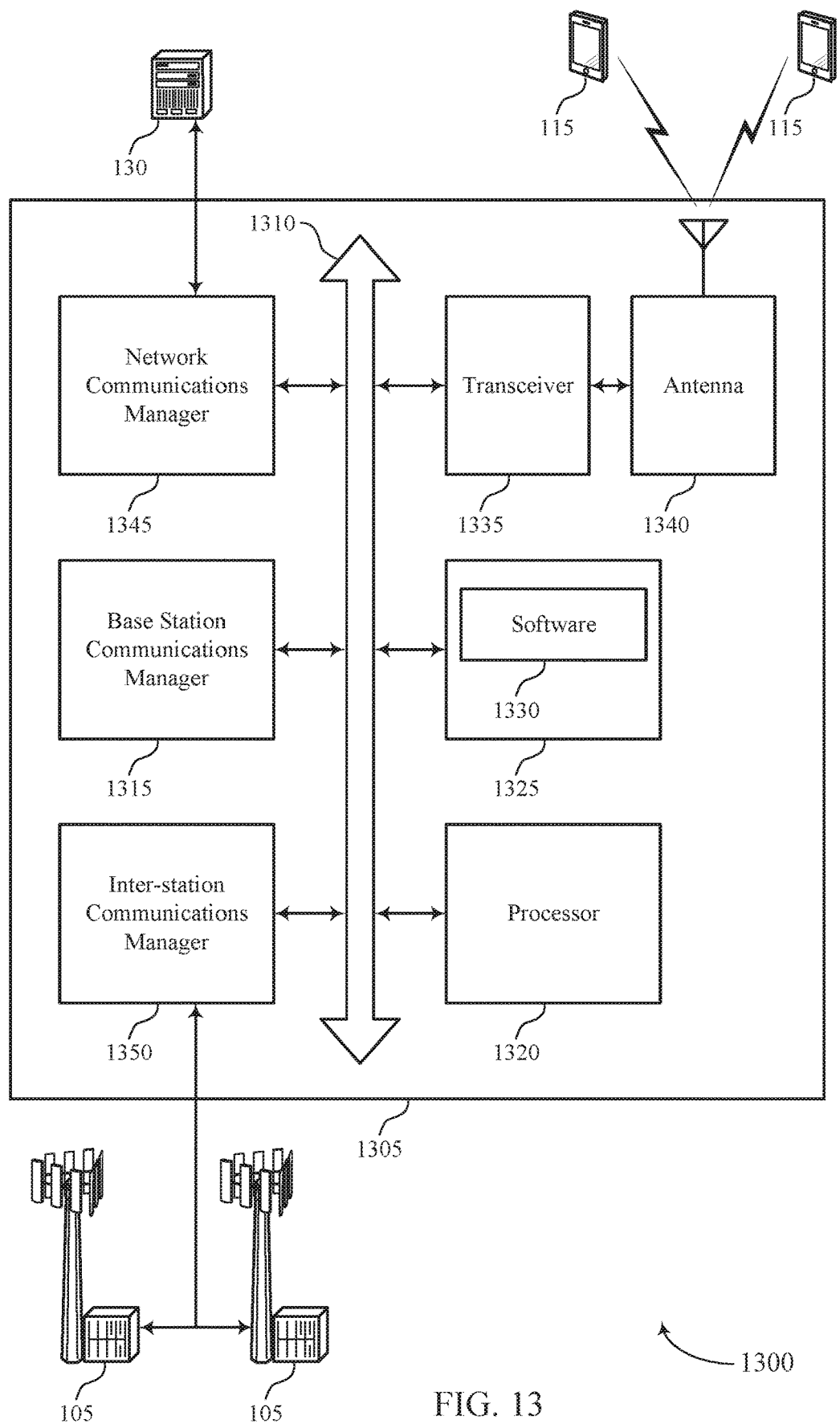
FIG. 13 illustrates a block diagram of a system including a base station that supports a PRG size for precoded reference signals in accordance with aspects of the present disclosure.

FIG. 13 shows a diagram of a system 1300 including a device 1305 that supports a PRG size for precoded reference signals in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting physical resource group size for precoded channel state information reference signals).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support physical resource group size for precoded channel state information reference signals. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions. Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
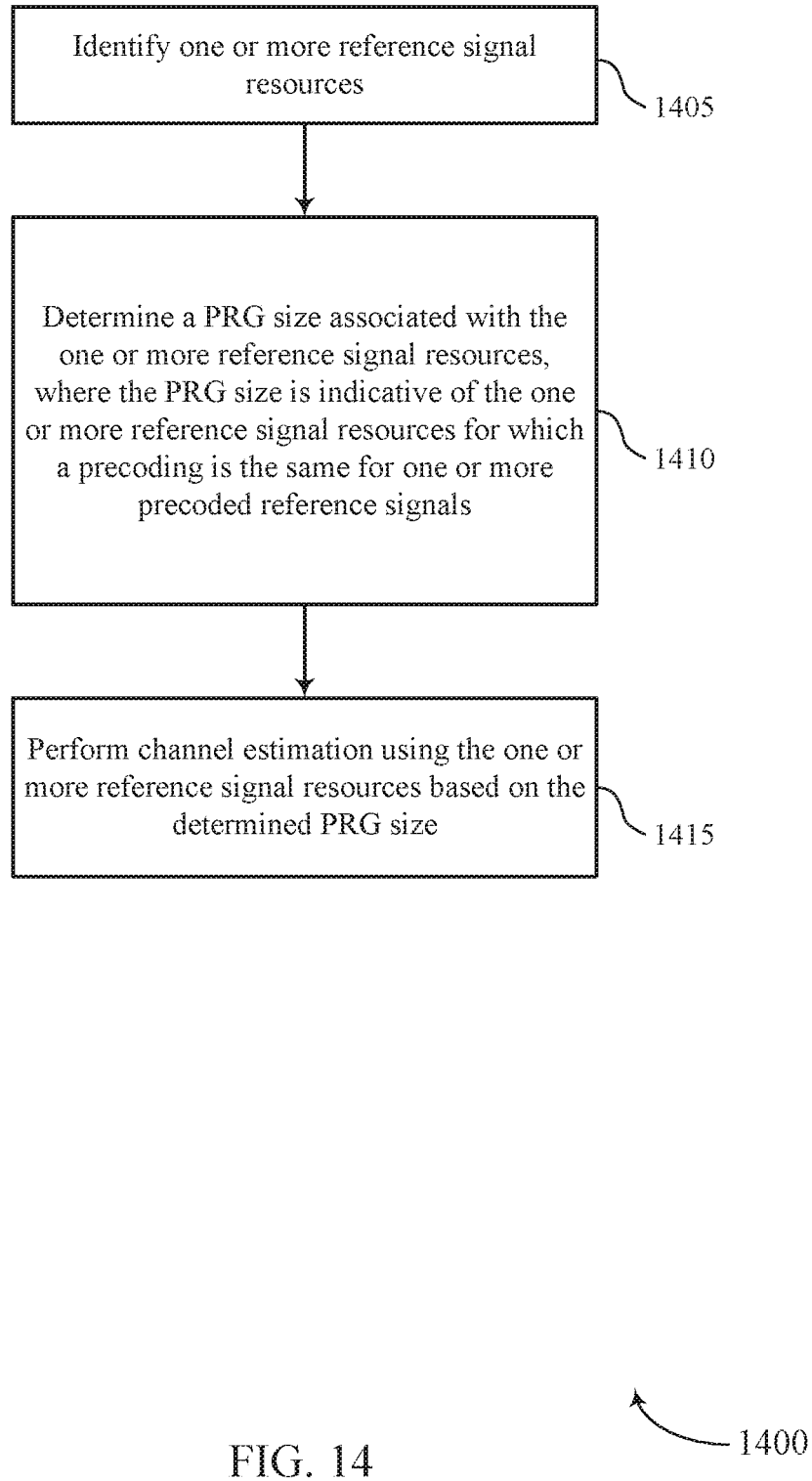
FIGS. 14 through 18 illustrate methods for a PRG size for precoded reference signals in accordance with aspects of the present disclosure.

FIG. 14 shows a flowchart illustrating a method 1400 for a PRG size for precoded reference signals in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify one or more reference signal resources. In an example, the UE 15 may identify that the one or more reference signal resources are associated with one or more resource sets of one or more resource settings. The operations of block 1405 may be performed according to the methods described herein. In certain examples, aspects of the operations of block 1405 may be performed by a UE reference signal manager as described with reference to FIGS. 6 through 9.

At block 1410 the UE 115 may determine a physical resource group (PRG) size associated with the one or more reference signal resources, wherein the PRG size is indicative of the one or more reference signal resources for which a precoding is the same for one or more precoded reference signals. The operations of block 1410 may be performed according to the methods described herein. In certain examples, aspects of the operations of block 1410 may be performed by a PRG size component as described with reference to FIGS. 6 through 9.

At block 1415 the UE 115 may perform channel estimation using the one or more reference signal resources based at least in part on the determined PRG size. The operations of block 1415 may be performed according to the methods described herein. In certain examples, aspects of the operations of block 1415 may be performed by a channel estimation component as described with reference to FIGS. 6 through 9.

Figure 15:
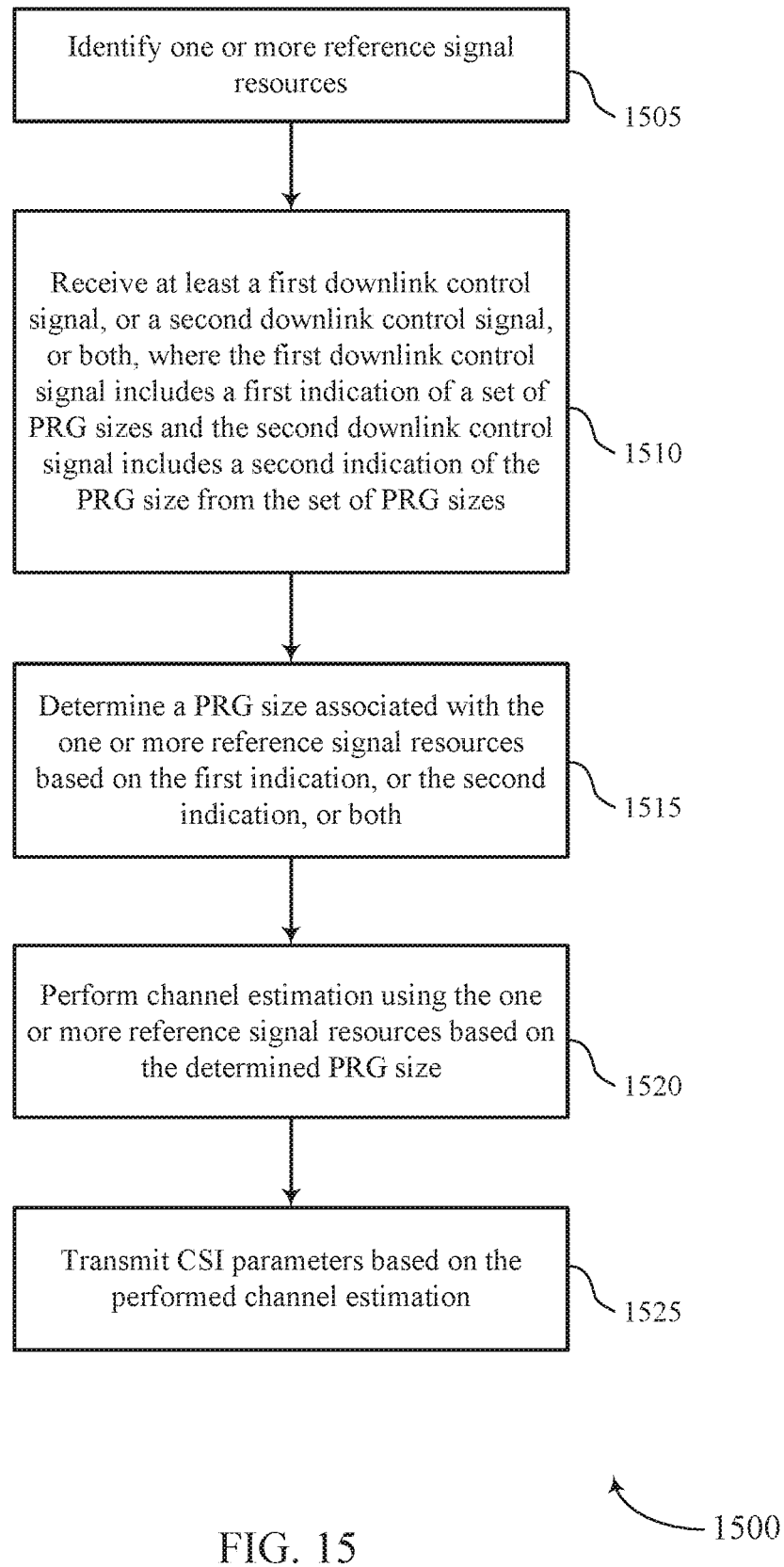

FIG. 15 shows a flowchart illustrating a method 1500 for a PRG size for precoded reference signals in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify one or more reference signal resources. The operations of block 1505 may be performed according to the methods described herein. In certain examples, aspects of the operations of block 1505 may be performed by a UE reference signal manager as described with reference to FIGS. 6 through 9.

At block 1510 the UE 115 may receive at least a first downlink control signal, or a second downlink control signal, or both, where the first downlink control signal includes a first indication of a set of PRG sizes and the second downlink control signal includes a second indication of the PRG size from the set of PRG sizes. The operations of block 1510 may be performed according to the methods described herein. In certain examples, aspects of the operations of block 1510 may be performed by a PRG size component as described with reference to FIGS. 6 through 9.

At block 1515 the UE 115 may determine a PRG size associated with the one or more reference signal resources based on the first indication, or the second indication, or both. The operations of block 1515 may be performed according to the methods described herein. In certain examples, aspects of the operations of block 1515 may be performed by a PRG size component as described with reference to FIGS. 6 through 9.

At block 1520 the UE 115 may perform channel estimation using the one or more reference signal resources based at least in part on the determined PRG size. The operations of block 1520 may be performed according to the methods described herein. In certain examples, aspects of the operations of block 1520 may be performed by a channel estimation component as described with reference to FIGS. 6 through 9.

At block 1525 the UE 115 may transmit CSI parameters based at least in part on the performed channel estimation. The operations of block 1525 may be performed according to the methods described herein. In certain examples, aspects of the operations of block 1525 may be performed by a CSI manager as described with reference to FIGS. 6 through 9.

Figure 16:
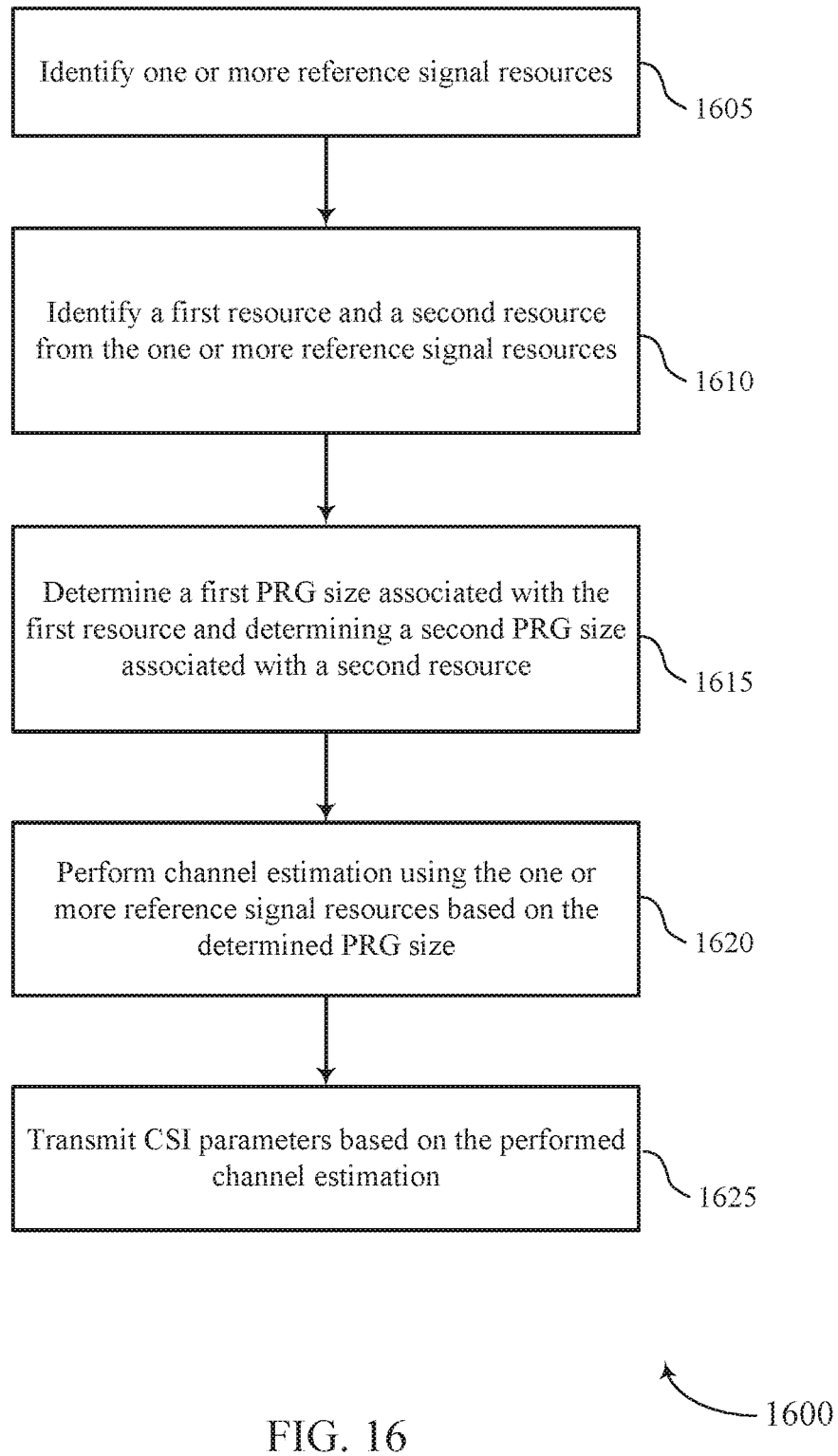

FIG. 16 shows a flowchart illustrating a method 1600 for a PRG size for precoded reference signals in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify one or more reference signal resources. The operations of block 1605 may be performed according to the methods described herein. In certain examples, aspects of the operations of block 1605 may be performed by a UE reference signal manager as described with reference to FIGS. 6 through 9.

At block 1610, the UE 115 may identify a first resource and a second resource from the one or more reference signal resources. The operations of block 1610 may be performed according to the methods described herein. In certain examples, aspects of the operations of block 1610 may be performed by a PRG size component as described with reference to FIGS. 6 through 9.

At block 1615, the UE 115 may determine a first PRG size associated with first reference signal resources and determining a second PRG size associated with second reference signal resources. The operations of block 1615 may be performed according to the methods described herein. In certain examples, aspects of the operations of block 1615 may be performed by a PRG size component as described with reference to FIGS. 6 through 9.

At block 1620 the UE 115 may perform channel estimation using the one or more reference signal resources based at least in part on the determined PRG size. The operations of block 1620 may be performed according to the methods described herein. In certain examples, aspects of the operations of block 1620 may be performed by a channel estimation component as described with reference to FIGS. 6 through 9.

At block 1625 the UE 115 may transmit channel state information (CSI) parameters based at least in part on the performed channel estimation. The operations of block 1625 may be performed according to the methods described herein. In certain examples, aspects of the operations of block 1625 may be performed by a CSI manager as described with reference to FIGS. 6 through 9.

Figure 17:
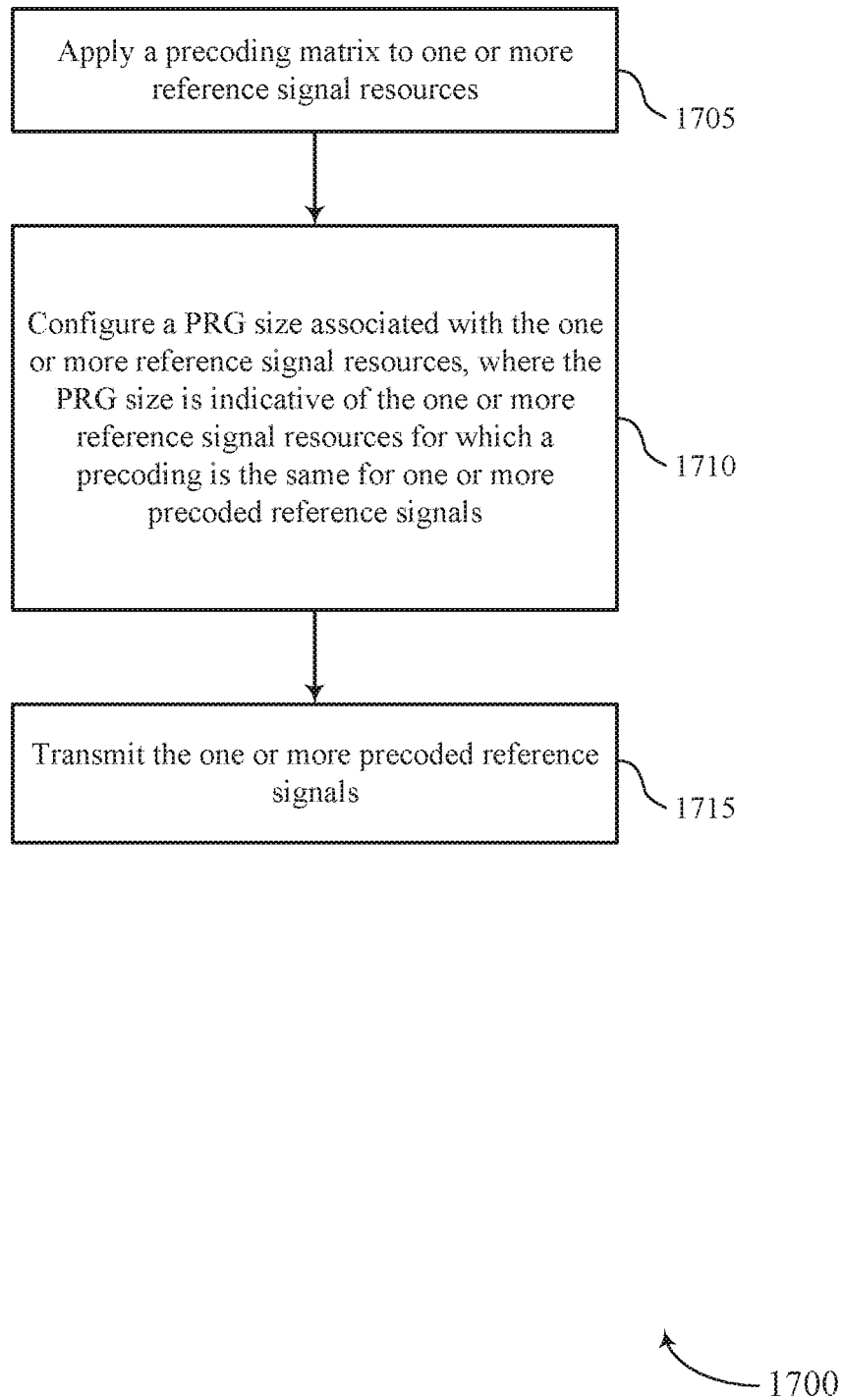

FIG. 17 shows a flowchart illustrating a method 1700 for a PRG size for precoded reference signals in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may apply a precoding matrix to one or more reference signal resources. The operations of block 1705 may be performed according to the methods described herein. In certain examples, aspects of the operations of block 1705 may be performed by a precoding matrix component as described with reference to FIGS. 10 through 13.

At block 1710 the base station 105 may configure a physical resource group (PRG) size associated with the one or more reference signal resources, wherein the PRG size is indicative of the one or more reference signal resources for which a precoding is the same for one or more precoded reference signals. The operations of block 1710 may be performed according to the methods described herein. In certain examples, aspects of the operations of block 1710 may be performed by a PRG manager as described with reference to FIGS. 10 through 13.

At block 1715 the base station 105 may transmit the one or more precoded reference signals. The operations of block 1715 may be performed according to the methods described herein. In certain examples, aspects of the operations of block 1715 may be performed by a base station reference signal manager as described with reference to FIGS. 10 through 13.

Figure 18:
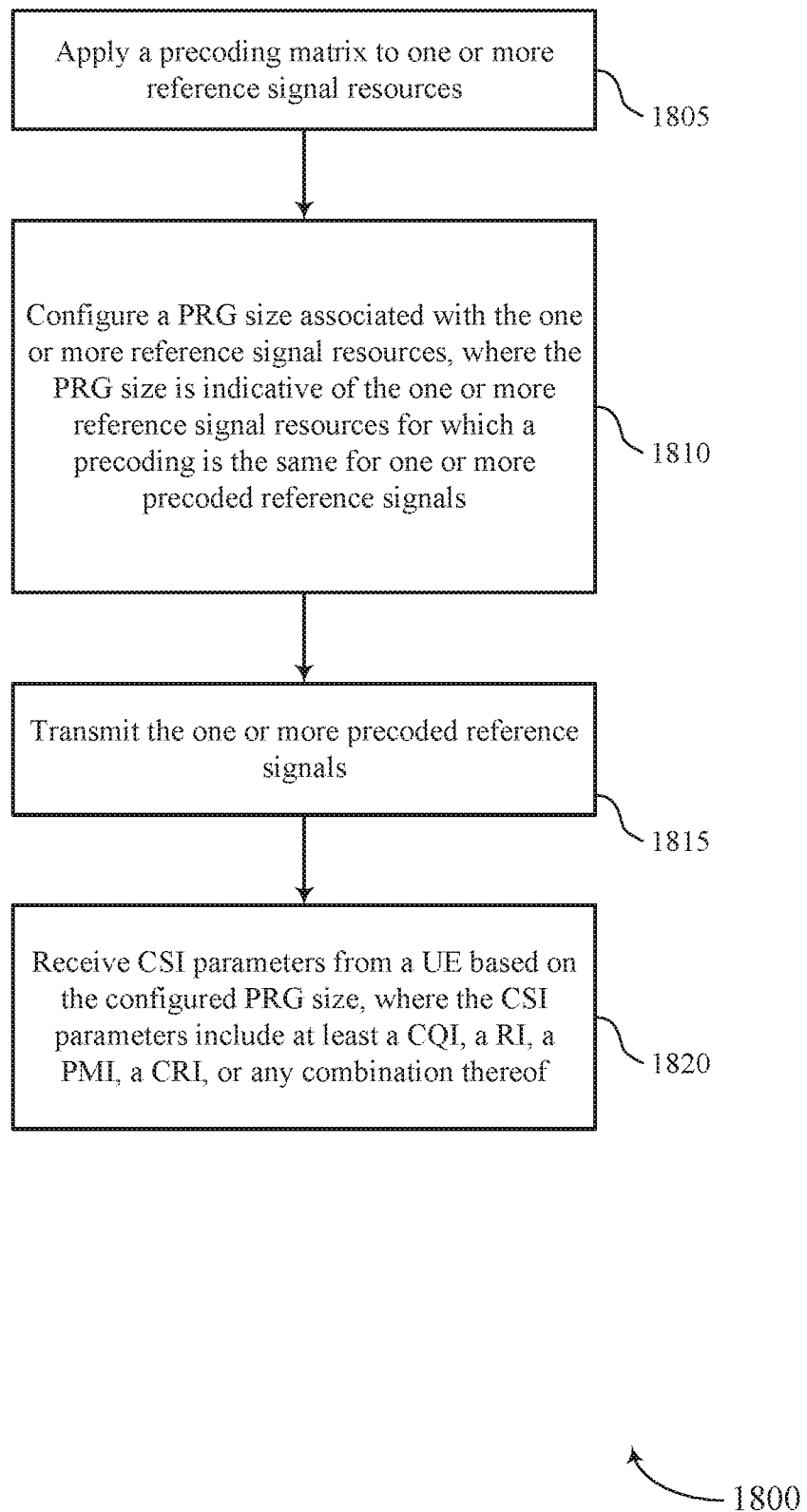

FIG. 18 shows a flowchart illustrating a method 1800 for a PRG size for precoded reference signals in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may apply a precoding matrix to one or more reference signal resources. The operations of block 1805 may be performed according to the methods described herein. In certain examples, aspects of the operations of block 1805 may be performed by a precoding matrix component as described with reference to FIGS. 10 through 13.

At block 1810 the base station 105 may configure a physical resource group (PRG) size associated with the one or more reference signal resources, wherein the PRG size is indicative of the one or more reference signal resources for which a precoding is the same for one or more precoded reference signals. The operations of block 1810 may be performed according to the methods described herein. In certain examples, aspects of the operations of block 1810 may be performed by a PRG manager as described with reference to FIGS. 10 through 13.

At block 1815 the base station 105 may transmit the one or more precoded reference signals. The operations of block 1815 may be performed according to the methods described herein. In certain examples, aspects of the operations of block 1815 may be performed by a base station reference signal manager as described with reference to FIGS. 10 through 13.

At block 1820 the base station 105 may receive channel state information (CSI) parameters from a UE based on the configured PRG size, wherein the CSI parameters comprise at least a channel quality indicator (CQI), a rank indicator (RI), a precoding matrix indicator (PMI), a channel resource indicator (CRI), or any combination thereof. The operations of block 1820 may be performed according to the methods described herein. In certain examples, aspects of the operations of block 1820 may be performed by a CSI component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a first reference signal resource and a second reference signal resource within a same bandwidth, wherein the first reference signal resource and the second reference signal resource each comprise a channel state information reference signal (CSI-RS) resource;
   determining a first physical resource group (PRG) size associated with the first reference signal resource;
   determining a second PRG size associated with the second reference signal resource, the second PRG size being different from the first PRG size, wherein each of the first PRG size and the second PRG size is indicative of respective sets of reference signal resources for which a precoding is the same for one or more precoded CSI-RSs; and
   performing channel estimation using one or more reference signal resources based at least in part on the determined first PRG size and the determined second PRG size.

2. The method of claim 1, further comprising:
   transmitting channel state information (CSI) parameters based at least in part on the performed channel estimation.

3. The method of claim 2, wherein the CSI parameters comprise at least a channel quality indicator (CQI), a rank indicator (RI), a precoding matrix indicator (PMI), a channel resource indicator (CRI), or any combination thereof.

4. The method of claim 1, wherein each reference signal resource of the one or more reference signal resources is associated with one or more resource sets, and each of the one or more resource sets is associated with one or more resource settings.

5. The method of claim 1, further comprising:
   receiving a downlink control signal that comprises an indication of the first PRG size and the second PRG size; and
   determining the first PRG size and the second PRG size based at least in part on the indication.

6. The method of claim 5, wherein the indication indicates the first PRG size and the second PRG size in a resource indication, a resource set configuration, or a resource setting configuration.

7. The method of claim 6, wherein the first PRG size and the second PRG indicated in the resource indication are for a reference signal resource of the one or more reference signal resources to which the resource indication corresponds, the first PRG size and the second PRG size indicated in the resource set configuration are the same for each reference signal resource of the one or more reference signal resources within a resource set to which the resource set configuration corresponds, the first PRG size and the second PRG size indicated in the resource setting configuration are the same for each reference signal resource of the one or more reference signal resources of any resource sets to which the resource setting configuration corresponds, or any combination thereof.

8. The method of claim 1, wherein determining the first PRG size and the second PRG size comprises:
   receiving at least a first downlink control signal, or a second downlink control signal, or both, wherein the first downlink control signal comprises a first indication of a set of PRG sizes, and wherein the second downlink control signal comprises a second indication of the first PRG size and the second PRG size from the set of PRG sizes; and
   the method further comprising determining the first PRG size and the second PRG size based at least in part on the first indication, or the second indication, or both.

9. The method of claim 8, wherein each of the first indication and the second indication comprises a downlink control information (DCI) format, a cyclic redundancy check (CRC) scrambling type, or both.

10. The method of claim 8, wherein the first indication of the set of PRG sizes and the second indication of the first PRG size and the second PRG size are a same indication or a different indication used for a second set of PRG sizes associated with a demodulation reference signal (DMRS), wherein the set of PRG sizes are the same as a second set of PRG sizes associated with the DMRS, and wherein the first PRG size and the second PRG size are the same as a third PRG size associated with the DMRS.

11. The method of claim 8, wherein each of the first downlink control signal and the second downlink control signal comprises downlink control information (DCI), a radio resource control (RRC) message, a medium access control (MAC) control element (CE), or a system information block (SIB).

12. The method of claim 1, further comprising:
identifying a preferred resource from the first reference signal resource and the second reference signal resource based at least in part on the first PRG size and the second PRG size; and
transmitting a channel resource indicator (CRI) signaling the preferred resource.

13. The method of claim 1, wherein a value of the first PRG size and a value of the second PRG size are based at least in part on a PRG size of a demodulation reference signal (DMRS) and data, a multiple of a resource block group (RBG) size, a portion of the RBG size, a system bandwidth, a UE capability, a reference signal pattern, or any combination thereof.

14. A method for wireless communication at a base station, comprising:
applying a precoding matrix to a first reference signal resource and a second reference signal resource within a same bandwidth, wherein the first reference signal resource and the second reference signal resource each comprise a channel state information reference signal (CSI-RS) resource;
configuring a first physical resource group (PRG) size associated with the first reference signal resource;
configuring a second PRG size associated with the second reference signal resource, the second PRG size being different from the first PRG size, wherein each of the first PRG size and the second PRG size is indicative of respective sets of reference signal resources for which a precoding is the same for one or more precoded CSI-RSs; and
transmitting the one or more precoded CSI-RSs based at least in part on the configured first PRG size and the configured second PRG size.

15. The method of claim 14, wherein each reference signal resource is associated with one or more resource sets, and each of the one or more resource sets is associated with one or more resource settings.

16. The method of claim 14, wherein configuring the PRG size comprises:
transmitting a downlink control signal that comprises an indication of the first PRG size and the second PRG size.

17. The method of claim 16, wherein the indication indicates the first PRG size and the second PRG size in a resource indication, a resource set configuration, or a resource setting configuration.

18. The method of claim 14, wherein configuring the first PRG size and the second PRG size comprises:
transmitting at least a first downlink control signal, or a second downlink control signal, or both, wherein the first downlink control signal comprises a first indication of a set of PRG sizes, and wherein the second downlink control signal comprises a second indication of the first PRG size and the second PRG size from the set of PRG sizes.

19. The method of claim 18, wherein each of the first indication and the second indication comprises a downlink control information (DCI) format, a cyclic redundancy check (CRC) scrambling type, or both.

20. The method of claim 18, wherein the first indication of the set of PRG sizes and the second indication of the first PRG size and the second PRG size are a same indication or a different indication used for a second set of PRG sizes associated with a demodulation reference signal (DMRS), wherein the set of PRG sizes is the same as a second set of PRG sizes associated with the DMRS, and wherein the first PRG size and the second PRG size are the same as a third PRG size associated with the DMRS.

21. The method of claim 18, wherein each of the first downlink control signal and the second downlink control signal comprises downlink control information (DCI), a radio resource control (RRC) message, a medium access control (MAC) control element (CE), or a system information block (SIB).

22. The method of claim 14, further comprising:
receiving, as part of channel state information (CSI) parameters, a channel resource indicator (CRI) signaling a preferred resource based at least in part on the first reference signal resource and the second reference signal resource.

23. The method of claim 14, wherein the first PRG size and the second PRG size are based at least in part on a PRG size of a demodulation reference signal (DMRS) and data, a multiple of a resource block group (RBG) size, a portion of the RBG size, a system bandwidth, a UE capability, a reference signal pattern, or any combination thereof.

24. The method of claim 14, further comprising:
receiving channel state information (CSI) parameters from a UE based on the configured first PRG size, the configured second PRG size, or any combination thereof, wherein the CSI parameters comprise at least a channel quality indicator (CQI), a rank indicator (RI), a precoding matrix indicator (PMI), a channel resource indicator (CRI), or any combination thereof.

25. An apparatus for wireless communication, comprising:
means for identifying a first reference signal resource and a second reference signal resource within a same bandwidth, wherein the first reference signal resource and the second reference signal resource each comprise a channel state information reference signal (CSI-RS) resource;
means for determining a first physical resource group (PRG) size associated with the first reference signal resource;
means for determining a second PRG size associated with the second reference signal resource, the second PRG size being different from the first PRG size, wherein each of the first PRG size and the second PRG size is indicative of respective sets of reference signal resources for which a precoding is the same for one or more precoded CSI-RSs; and
means for performing channel estimation using one or more reference signal resources based at least in part on the determined first PRG size and the determined second PRG size.

26. An apparatus for wireless communication, comprising:
means for applying a precoding matrix to a first reference signal resource and a second reference signal resource associated with reference signal resources within a same bandwidth, wherein the first reference signal resource and the second reference signal resource each comprise a channel state information reference signal (CSI-RS) resource;

means for configuring a first physical resource group (PRG) size associated with the first reference signal resource;

means for configuring a second PRG size associated with the second reference signal resource, wherein each of the first PRG size and the second PRG size is indicative of respective sets of reference signal resources for which a precoding is the same for one or more precoded CSI-RSs; and means for transmitting the one or more precoded CSI-RSs based at least in part on the configured first PRG size and the configured second PRG size.

* * * * *